United States Patent [19]

Klinner

[11] Patent Number: 4,991,385
[45] Date of Patent: * Feb. 12, 1991

[54] CROP HARVESTING APPARATUS AND METHODS

[75] Inventor: Wilfred E. Klinner, Woburn Sands, United Kingdom

[73] Assignee: National Research Development Corporation, London, England

[*] Notice: The portion of the term of this patent subsequent to Dec. 13, 2005 has been disclaimed.

[21] Appl. No.: 340,783

[22] Filed: Apr. 20, 1989

Related U.S. Application Data

[60] Division of Ser. No. 35,909, Apr. 8, 1987, Pat. No. 4,843,806, which is a continuation-in-part of Ser. No. 879,109, May 27, 1986, Pat. No. 4,790,128.

[51] Int. Cl.$^5$ .................... A01D 82/00; A01D 65/02; A01D 89/00
[52] U.S. Cl. .................................. 56/364; 56/DIG. 1
[58] Field of Search ............... 56/1, 15.8, 16.4, 192, 56/220, 226, DIG. 1, DIG. 17, 364

[56] References Cited

U.S. PATENT DOCUMENTS

| | | |
|---|---|---|
| 15,384 | 6/1822 | Luedke . |
| 1,418,544 | 6/1922 | Dill . |
| 1,604,458 | 10/1926 | Luedke . |
| 3,977,165 | 8/1976 | Klinner et al. .................... 56/16.4 |
| 4,499,712 | 2/1985 | Klinner ............................. 56/16.4 |
| 4,578,937 | 4/1986 | West et al. ....................... 56/130 |
| 4,581,880 | 4/1986 | Klinner ............................. 56/364 |
| 4,592,194 | 6/1986 | Amstutz ........................... 56/192 X |
| 4,671,051 | 6/1987 | Klinner ............................. 56/16.4 |
| 4,790,128 | 12/1988 | Klinner ....................... 56/DIG. 1 |

FOREIGN PATENT DOCUMENTS

| | | |
|---|---|---|
| 0162431 | 11/1985 | European Pat. Off. . |
| 737261 | 12/1932 | France . |
| 994505 | 11/1951 | France . |
| 572040 | 9/1945 | United Kingdom . |
| 976171 | 11/1964 | United Kingdom . |
| 2000952 | 1/1979 | United Kingdom . |
| 1598910 | 9/1981 | United Kingdom . |
| 2099272 | 12/1982 | United Kingdom . |

Primary Examiner—William P. Neuder
Attorney, Agent, or Firm—Cushman, Darby & Cushman

[57] ABSTRACT

In a row crop harvester a rotor 11 has rows of crop engaging elements 15 extending transversely across the direction of forward travel of the machine, the elements being aligned with the rows to be harvested. Each element has inwardly converging side edges for gathering the crop of a row and for detaching required crop parts which are impelled in a high-speed stream upwardly and rearwardly over the rotor beneath a hood 18. At the junction of each inwardly converging pair of edges a space 21 is provided for stripping crop and releasing stripped stems. Preferably the space 21 is a relief space having re-entrant edges 20 for stripping forwardly facing parts of the crop.

14 Claims, 21 Drawing Sheets

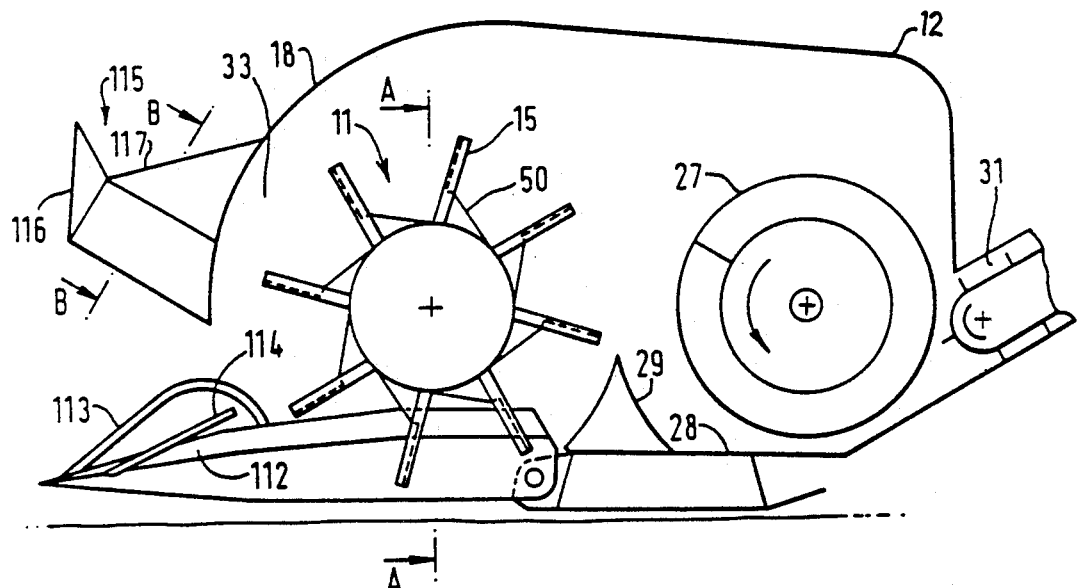
FIG. 1.
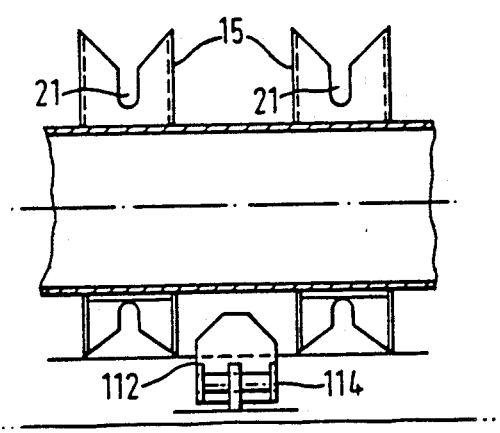
FIG. 2.
FIG. 3.

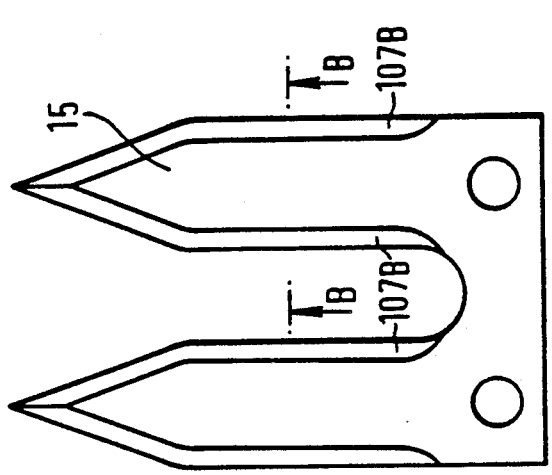
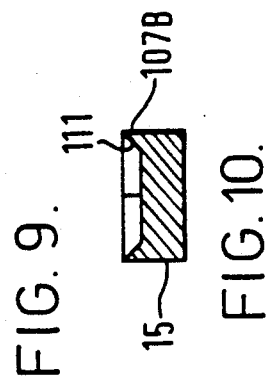
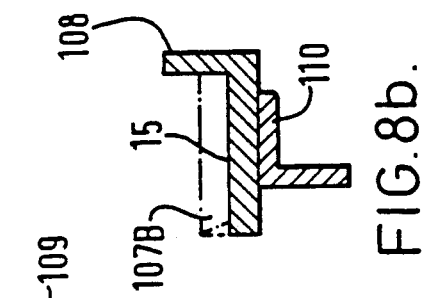
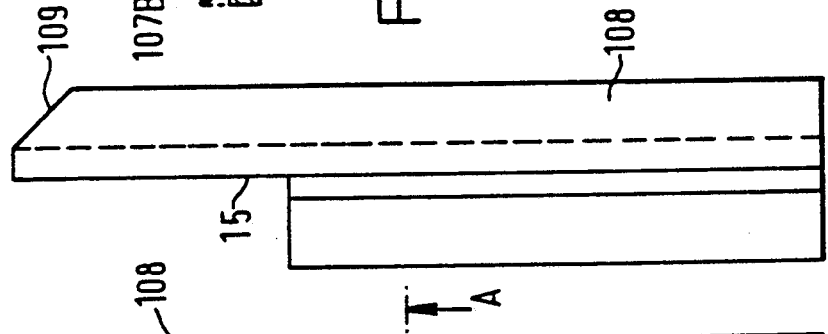
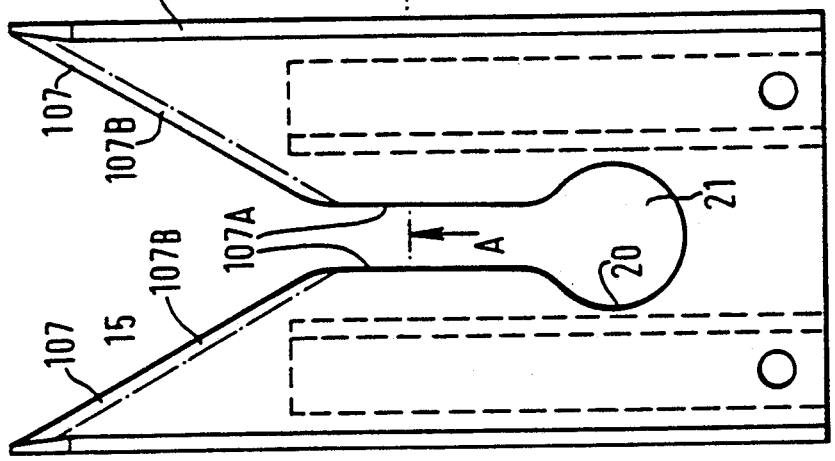

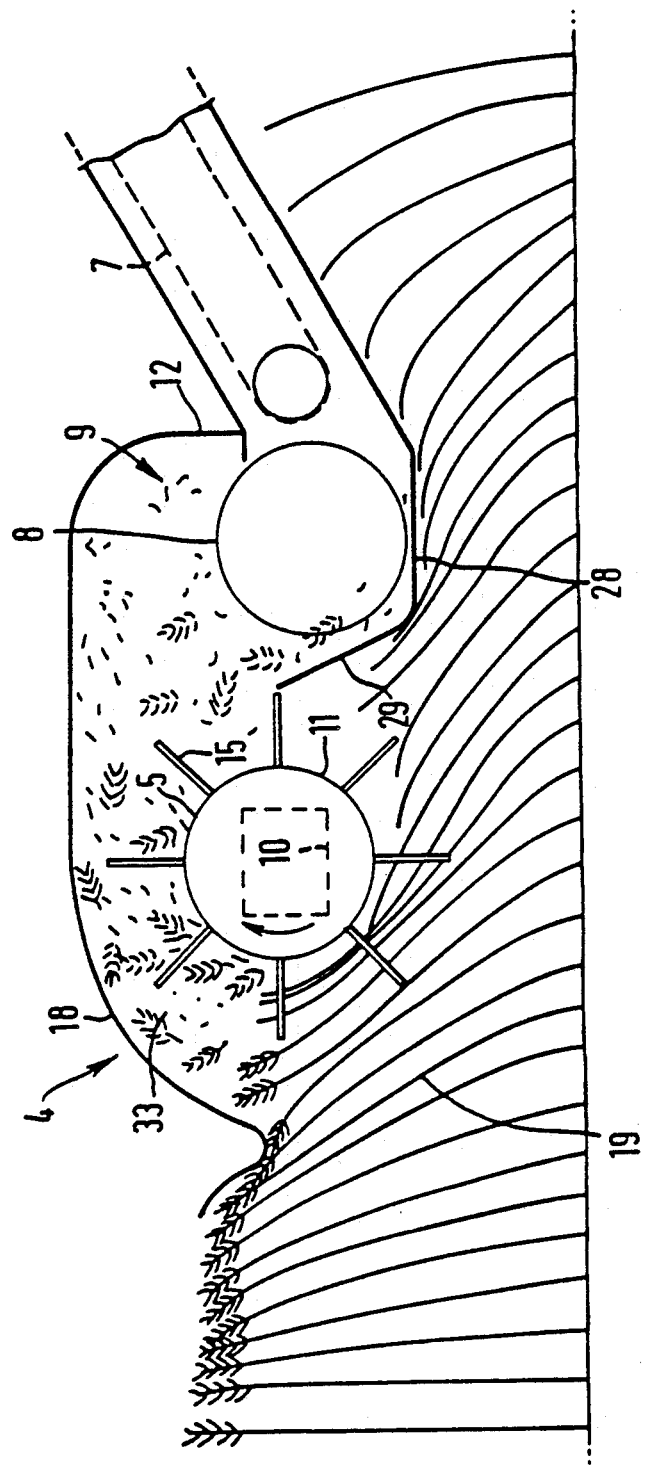

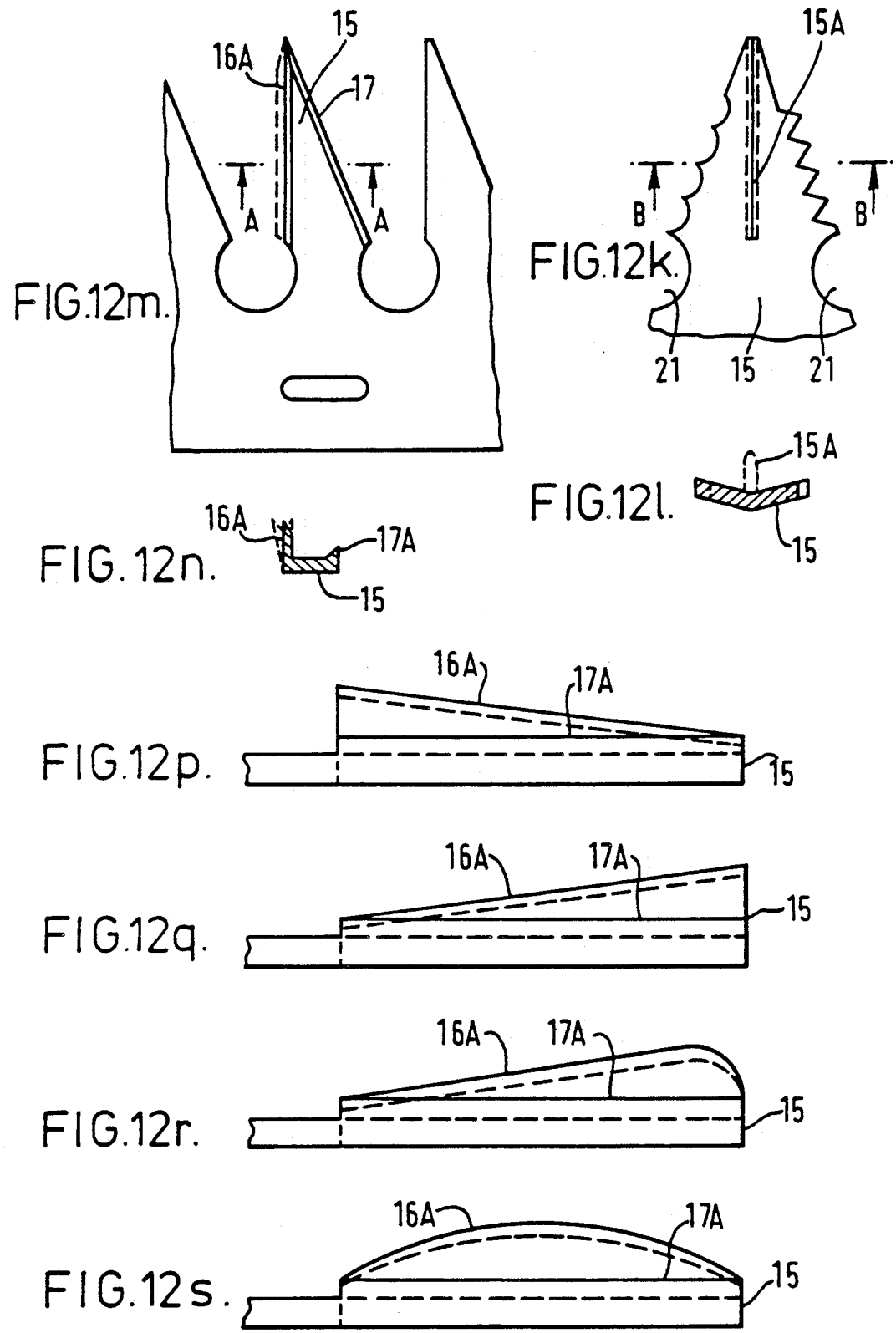

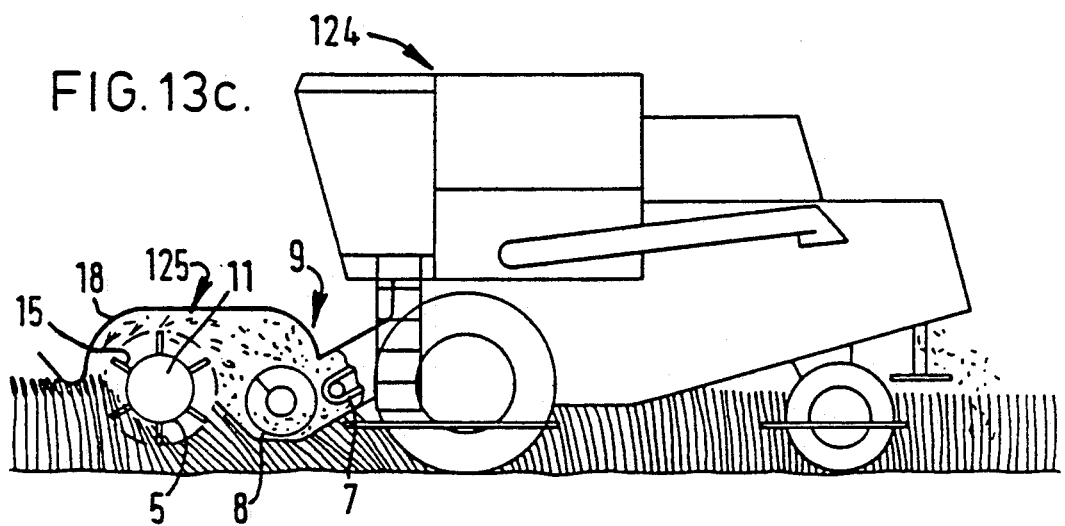
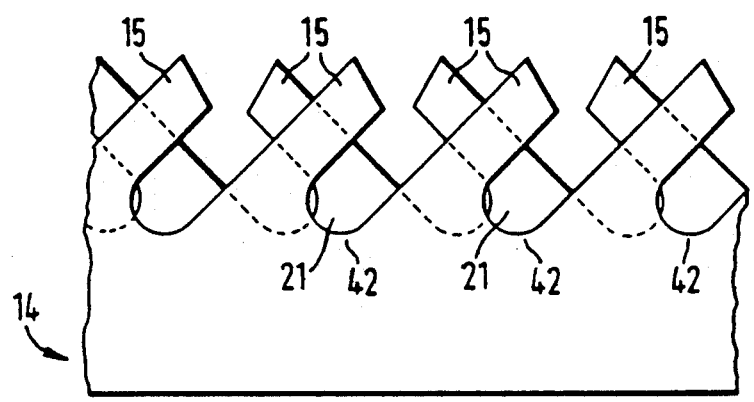

CROP HARVESTING APPARATUS AND METHODS

This is a continuation division of Application No. 07/035,909, filed Apr. 8, 1987, now U.S. Pat. No. 4,843,806, which is a CIP of US Appln. No. 06/879,109 filed May 27, 1986, now U.S. Pat. No. 4,790,128, which is derived from PCT/GB85/00442, filed Sep. 26, 1985.

The present invention relates to apparatus for, and methods of, harvesting crop. The invention is concerned with detaching from the stems or other plant parts of standing crop, seeds, seed-bearing parts, leaves, twigs, flowers, or other predetermined required portion of the crop, collecting the required portion, and leaving the remaining stripped parts of the crop standing in the field. The invention has particular but not exclusive application in the harvesting of grain crops, such as wheat, oats, barley, and rice. The invention also has application in the stripping of leaves, young shoots, and sometimes blossom from crops. Examples include lucerne (alfalfa) leaves for protein production, and the leaves and flowers of herbs and other crops used for the extraction of essential oils and other constituents.

It is an object of the present invention to provide improved apparatus for and methods of stripping required parts from a standing crop, usually the most valuable parts of the crop, namely the seed, leaves, and/or flowers. It is an object of the invention to overcome many of the disadvantages of known harvesting methods and devices, and to simplify, hasten and make less expensive the harvesting process.

According t the present invention in a first aspect there is provided apparatus for harvesting crop from rows of crops comprising a mobile frame for movement over the ground along a crop row, moveable support means mounted for driven movement relative to the frame, a plurality of outwardly projecting crop engaging elements mounted on the moveable support means, guide means for co-operating with the crop engaging elements to form a crop flow passage, and drive means for driving the moveable support means to carry the elements upwardly at a front region of the apparatus so as to detach from standing crop predetermined required parts of the crop and to move the detached crop parts along the crop flow passage, the crop engaging elements being arranged to project forwardly when engaging standing crop and being adapted to be aligned in operation with the crop rows being harvested, each element having a pair of inwardly converging edges for gathering crop of a row and a transverse surface for moving the detached crop parts along the crop flow passage.

The invention encompasses apparatus for detaching from the stems or other plant parts of standing crop, seeds, seed-bearing parts, leaves, twigs, flowers and/or other predetermined required parts of the crop, by rubbing and/or breaking and/or tearing the parts from the stems.

By the term standing crop is meant crop in the field before any harvesting operation has been carried out on it, for example before any cutting operation, and the term standing crop includes crop which may be laid, leaning, or twisted, as well as upright crop.

By a transverse surface is meant a surface which lies substantially in a plane which extends principally transverse to the direction of movement of the element. The plane of the surface may conveniently be substantially flat, but in some arrangements may be curved, preferably slightly concave.

Preferably the apparatus includes laterally spaced apart crop row dividers mounted on the mobile frame and protruding forwardly for entering between crop rows.

In accordance with a particularly preferred feature of the invention, there is provided at the junction of said inwardly converging edges a space for allowing stripped remaining crop parts to be released from the elements and/or for providing edges of the elements adapted to strip required parts from the crop.

In some arrangements each element includes at the junction of the said inwardly converging edges an inwardly extending slot aligned along the general direction of forward movement of the apparatus.

In a particularly preferred form the said inwardly converging edges lead to a relief space having edges which diverge from each other in the direction away from the distal tips of the elements. Preferably the said relief space is formed directly between the inwardly converging edges by re-entrant edges leading away from the inwardly converging edges. Alternatively a said relief space is formed at the end of the said inwardly extending slot. In some arrangements more than one relief space is provided in the region between the inwardly converging edges.

It is a particularly preferred feature of the invention that the edges of the relief spaces are adapted to detach crop parts from regions of the standing crop which face forwardly relative to the intended direction of movement of the apparatus.

In preferred constructions of the invention, at least some of the crop engaging elements have re-entrant edges.

Another preferred feature of the invention is that the outer sides of the elements are substantially parallel to the intended direction of forward movement of the machine along the crop row. In some preferred forms at least some of the edges of the elements has a raised ramp-shaped lip leading from the said transverse surface. Also in preferred forms each outer side of the elements has an inclined wing protruding forwardly relative to the direction of movement of the element through the crop, and inclined to the said transverse surface.

Preferably the drive means is arranged to drive the crop stripping elements at a speed such that detached crop parts are impelled along the crop flow passage and do not reside to any substantial extent on the moving elements.

Preferably the drive means is arranged to drive the crop stripping elements at a tip speed greater than 5 m/s, most preferably at a tip speed in the range 5 to 15 m/s.

Preferably the crop stripping elements are resiliently mounted, and/or made of flexible resilient material. Preferably the guide means comprises a cover extending around at least part of the region at which the crop engaging elements move at the front region of the apparatus. Preferably each said transverse surface for impelling detached crop parts along the crop flow passage is substantially flat.

Preferably the said moveable support means comprises a rotor, but may alternatively comprise an endless conveyor.

In some arrangements the crop engaging elements are arranged in rows transverse to the direction of forward movement of the apparatus. Preferably the said crop stripping elements are arranged with succeeding elements along the support means in register with one another.

There is also provided in accordance with the present invention a method of harvesting crop from rows of crops comprising moving along a crop row through a standing crop a harvesting apparatus, moving upwardly at a front region of the apparatus a plurality of outwardly projecting crop engaging elements, engaging the standing crop by the moving elements when projecting forwardly relative to the direction of movement of the apparatus, detaching from standing crop predetermined required parts of the crop, conveying the detached crop parts along a crop flow passage by transverse surfaces of crop engaging elements, and collecting the detached crop parts, the method including the steps of engaging the crop by elements which are aligned in operation with the crop rows being harvested, gathering the crop of a row between inwardly converging edges of crop engaging elements, stripping crop parts by the elements, and moving the detached crop parts along the crop flow passage by transverse surfaces of the elements.

It is a feature of the present invention that the crop engaging elements are preferably moved at a relatively high speed. A number of criteria can be used to establish the required high speed, for example the speed of movement of the crop engaging elements relative to the frame will normally be set to be substantially greater than the forward speed of movement of the frame, and set at a speed such as to propel the stripped material in a fast moving stream along the crop flow passage defined between the guide means and the crop engaging elements. Preferably the tip speed of the crop engaging elements is greater than 5 m/s, conveniently within the approximate range 5 to 15 m/s. The forward speed of the frame may be in a range up to 15 km/hour, preferably in the range 3 to 9 km/hour.

A distinction of row crops from cereal crops is, for example, that the row spacing is very much greater, and that row crops have stems several times the diameter of cereal crops. For cereals the spacing might be 125 to 175 mm, and for row crops the spacing might be 200 to 750 mm. The stem diameter for cereals might be 3 to 6 mm. The stem diameter for row crops might be 8 to 40 mm. Row crops grow very much taller, for example 2 m or more. Another difference is that often the material being harvested, for example cobs, occurs relatively low down the stem, whereas with cereal crops the material being harvested is all positioned at the head of the crop. Examples of row crops include maize, sorghum, oil seed rape, and field beans.

There will now be introduced a number of further features of the invention, set out in an independent second, broad, aspect, applicable in harvesting apparatus generally.

According to the present invention in an independent, broad, second aspect, there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly at a front region of the apparatus so as to detach from standing crop predetermined required parts of the crop and to move the detached crop parts along the crop flow passage; when in combination with any one of any combination of the novel features set out in this specification.

A first feature of the second aspect of the invention is concerned with the general arrangement of the crop engaging elements and the moveable support means on which they are mounted.

In accordance with a preferred feature the said moveable support means is a rotor and the said elements are arranged in rows spaced circumferentially around the rotor and aligned substantially parallel to the axis of the rotor, the core of the rotor being shaped by a series of substantially planar surfaces joining succeeding rows of elements around the rotor, each planar surface being substantially tangential where it abuts the base of the leading row of elements to which it adjoins, and being inclined to a tangent where it abuts the next following row of elements, relative to the direction of rotation of the rotor.

Preferably each planar surface of the rotor core is inclined to the said next following row of crop engaging elements at an angle between the leading face of the row of elements and the outer face of the planar surface in the range 110° to 140°.

Most preferably the said angle lies in the range 120° to 130°.

Preferably each substantially planar surface of the core is a flat planar surface. As an alternative to being flat, the substantially planar surfaces of the rotor core may be concave or convex.

In accordance with another preferred feature each outwardly directed crop engaging element is inclined to a radius of the rotor passing through its base at an angle in the range 5° to 20°. Preferably the said angle lies in the range 13° to 17°.

A second feature of the second aspect of the invention is concerned with the said guide means which co-operates with the crop engaging elements to form the crop flow passage.

In accordance with a preferred feature the said guide means comprises a cover extending around at least part of the region at which the crop engaging elements move upwardly and rearwardly, and one or more driven or freely rotating rotors at the intake region of the crop flow passage, there being provided means for varying the position of the rotor or rotors at the intake region, in such a manner as to vary the vertical clearance between the rotor or rotors and the around at the intake region, and to vary the length of the hood to correspond to the adjusted position of the intake rotor or rotors.

In accordance with another preferred feature the said guide means comprises a cover extending around at least part of the region of which the crop engaging elements move upwardly and rearwardly, the cover including a planar shelf-like member projecting rearwardly and providing the trailing edge of the cover in the crop entrance region, to arrest, redirect and hence aid recovery of forwardly projected crop particles, especially in conjunction with an auxiliary feed-assisting rotor in the crop intake region.

In one arrangement the shelf-like member is adjustable by movement forwardly or rearwardly substantially in the plane of the shelf-like member.

A third feature of the second aspect of the invention is concerned with the shape and form of the crop engaging elements in which at least some of the crop engaging elements comprise crop stripping elements each of which has at least one inclined edge for detaching crop parts from standing crop, and a transverse surface for impelling the detached crop parts along the crop flow passage.

In accordance with a preferred feature each crop stripping element is made from resilient synthetic plastics material, or the like, and has a strip of metal or other wear resistant material along the crop stripping edge or edges thereof.

In accordance with another preferred feature each crop stripping element has a raised ramp-shaped edge or lip on the said transverse surface for impelling the detached crop parts along the crop flow passage, said ramp-shaped edge or lip being arranged to raise the trajectories of particles and to impel them along the crop flow passage, preferably to impel particles into steeply upwardly directed recovery trajectories and into and along the crop flow passage.

In accordance with a further preferred feature each crop stripping element has upstanding ribs and/or outwardly angled wings for collecting and impelling stripped crop parts.

In accordance with a yet further preferred feature each element includes at the junction of adjacent elements an inwardly extending slot aligned along the general direction of forward movement of the apparatus, said inwardly extending slot including two or more relief spaces each defined by re-entrant edges of the crop stripping element, and/or said inwardly extending slot following a wave-shaped path so as to induce a lateral shaking motion in the stems of crop which pass to the said slot.

In accordance with another preferred feature, the guide means comprises a cover extending around at least part of the region at which crop engaging elements move upwardly, and an auxiliary driven or freely rotating rotor at the intake region of the crop flow passage, the auxiliary rotor having transverse ribs or paddles which are helically arranged to counteract any unevenness of operation of the crop engaging elements in stripping crop.

In general it is a feature that at least some of the crop engaging elements comprise crop stripping elements each of which has at least one inclined edge for detaching required crop parts from standing crop, and a transverse surface for impelling the detached crop parts along the crop flow passage.

In accordance with another feature at least some of the crop engaging elements comprise crop stripping elements each of which has a narrow tip for entering into and dividing crop, and has side edges for detaching the required crop parts, the said side edges diverging from each other in a direction away from the distal tip of the element.

Preferably the said side edges diverge from each other over at least a quarter of the crop engaging length of the element, more preferably over at least a third of the crop engaging length of the element, and most preferably over the major proportion of the crop engaging length of the element.

Preferably the said side edges diverge from each other away from the distal tip of the element at a total included angle of about 30°.

The elements may be of varying shapes which will be set out hereinafter, but it is preferred particularly that the distal tip region of each crop stripping element is pointed with the distal side edges diverging from the apex of the element, preferably the distal tip region having a transverse leading surface.

In accordance with one preferred feature of the invention in the second aspect there are provided on side edges of the crop stripping elements, and/or at the junction of adjacent crop stripping elements, relief spaces for detaching crop parts by the effect of edges of the spaces and for allowing stripped remaining crop parts to be released from the elements.

For example the crop stripping elements may be formed by the teeth of a series of transverse combs mounted on the support means transverse to the direction of movement of the support means, there being provided at the junction of adjacent side edges of adjacent teeth on a comb an aperture allowing stripped stems to be released from the comb, the said aperture having side edges adapted to strip the required parts from the crop stems.

In accordance with a preferred feature it may be provided that at least some of the relief spaces are defined by re-entrant edges of the elements adapted to strip crop parts from regions of the standing crop which face forwardly relative to the intended direction of movement of the apparatus.

Conveniently the crop stripping elements are formed of synthetic plastics material, but they may be made of metal or other materials of adequate strength and wear resistance.

The elements may comprise arrays of pointed, generally triangular teeth at the root of which are formed elongate straight or slanted recesses, to increase the duration and extent of the work done by the elements on the crop. There may also be provided circular, square, trapezoidal or other shapes of relief apertures wider than the narrowest part of each recess between pairs of teeth, to enable seed heads, stems, tillers or branches to receive all-round treatment, and after being stripped, to withdraw from the stripping space without interfering with incoming crop. In general it is preferred that transverse arrays of crop stripping elements are arranged along the crop conveying means so that tips of successive rows follow the same path, but this is not essential and elements may be variously staggered from row to row in some arrangements, for example being displaced laterally by half the tooth pitch.

Considering the invention in general, it is to be appreciated that the actual process of stripping will involve contact of different parts of the stripping elements with the crop at different times as the apparatus moves forwardly into the crop during the upward movement of the elements. Preferably the elements are shaped so that a progressive stripping action takes place as the machine moves forwardly and elements intrude to a greater extent into the crop.

The provision of a relief space or aperture at the junction of each pair of adjacent stripping elements may be made for detaching the required parts of the crop by engagement of the crop with the edges of an aperture at the junction of each pair of adjacent elements, and for the different, or additional, purpose of assisting release of crop from the elements after stripping. It is one particular preferred feature of the invention that such a relief space or aperture can be defined by a re-entrant edge and can assist in stripping required parts of the crop from the forward facing part of the stems which may not normally be engaged by the side edges of the elements.

Conveniently the said moveable support means comprises either a rotor or a conveyor belt or similar endless elongate conveying means for moving the crop engaging elements along a path including the required portion moving upwardly and rearwardly at the front region of the apparatus.

In some preferred forms of the invention the guide means comprises a cover extending around at least part of the region at which the crop engaging elements move upwardly and rearwardly, and there are provided one or more driven or freely rotating rotors at the intake region of the crop flow passage.

In a preferred form, there may be included an adjustable housing extending around at least part of the roller or rollers for adjusting the amount of interaction of the roller or rollers with standing crop.

Thus there may be provided under the edge of a hood or cover over a crop stripping rotor embodying the invention, a freely rotating rotor, or undershot driven roller, optionally ribbed, fluted, dimpled, or otherwise profiled or provided with small curved or straight tines or teeth, to counteract in undriven form the tensile forces applied by the stripping rotor to crop lying or leaning towards the rotor. When driven, such a roller acts to loosen or lift unfavourably presented crop before it makes contact with the rotor in addition to directing into the crop flow passage particles which are thrown towards it by the stripping combs. Instead of the single roller or rotor at this position, there may be provided below the leading edge of the front rotor cover a primary and a secondary crop control rotor to serve the purposes given above, the secondary rotor providing a stripping function for the primary rotor.

There may also be provided in some preferred forms of the invention particularly advantageous means for separating the detached parts of the crop into selected, different fractions. The low MOG content of stripper harvested material (that is to say material stripped in embodiments of the invention) make it possible to use particularly compact threshing and separating systems.

The separating means may comprise a separating screen against which the crop is propelled, the screen having spaces through which smaller parts of the crop pass, larger parts of the detached crop being deflected... by the screen, and/or by means of a rotary device against which the detached crop is propelled in such a manner that different fractions of the detached crop are directed differently by the rotary device.

The separating means may be arranged so that the detached parts of the crop are propelled against the screen or rotary device by the moving crop engaging elements on the moveable support means.

It may be arranged that the said screen directs the larger fraction of the detached crop parts to means for rubbing, rethreshing or comminuting the crop parts.

It may also be arranged that the rotary device comprises a forwardly rotating transverse auger, the detached crop being directed towards the top-dead-centre position of the auger so that different fractions of the detached crop are directed differently by the auger. In this way the short heavy fraction of stripped material may be directed rearwardly behind the auger and the bulky fraction forwardly and downwardly under the auger.

In accordance with other preferred features, there are provided means for preventing or inhibiting escape of the detached parts of the crop from the apparatus.

In preferred arrangements, the means for preventing or inhibiting escape of detached parts of the crop may comprise a hanging check curtain of flexible material against which detached crop parts are thrown at the front or rear of the apparatus by the moving crop engaging elements on the moveable support means; and/or one or more baffles or deflectors to prevent or reduce loss of detached crop parts due to ricochetting off a cover extending around the moving elements and/or due to bouncing out of a crop conveying means at the rear of the moveable support means; and/or at least one pronounced reverse step at the lower front region of a cover extending around at least part of the region in which the elements are moved upwardly and rearwardly by the moveable support means; and/or resilient lining of surfaces against which detached crop parts are thrown.

In a preferred arrangement there are provided a series of reverse steps in a lower, front section of a cover or hood over a rotor, to re-direct descending crop particles back towards the stripping mechanism.

In another preferred arrangement there may be provided an angularly and/or height adjustable hollow front section attached to the lower end of a rotor cover, of minimal weight or counter-balanced to rest and float on the crop canopy, to prevent forward splash or crop particles and re-direct particles towards the stripping rotor. Such a protruding front section gives useful guidance on header height setting to the operator of self-propelled harvesters.

In accordance with yet further preferred features, at least some of the crop engaging elements comprise planar crop stripping elements having principal planes transverse to the direction of movement of the elements, the elements being resiliently mounted, and/or made of flexible resilient material, to prevent or inhibit damage by impact with the ground or foreign objects.

It is a particularly preferred general feature that the crop engaging elements may be mounted in a position such as to engage crop unsupported by other components of the apparatus. In preferred embodiments, it may be arranged that the only components of the apparatus to enter into the crop and to divide and gather the crop in the region at which the said crop parts are stripped from the crop, are driven moving elements which are mounted on the said moveable support means.

It may also be arranged as a preferred general feature that the crop engaging elements are driven in movement in such a manner that detached crop parts do not reside to any substantial extent on the moving crop stripping elements. In particular it is preferred that the drive means is arranged to drive the elements at a speed sufficiently high to impel the detached crop parts along the crop flow passage and to release crop parts at the rear at least predominantly by centrifugal effect.

It is a generally preferred feature in all arrangements of the invention that each element may be an element having an overall width transverse to the direction of movement of the element which is greater than its thickness.

It may also be arranged as a preferred general feature that the leading crop engaging surface of each crop engaging element is a transverse, surface for impelling detached crop parts along the crop flow passage, each element having a principal plane transverse to the direction of movement of the element by the support means.

In general, those aspects of the invention which have been described with reference to apparatus according to the invention, may also be provided with reference to methods of harvesting in accordance with the invention, and vice-versa.

It is a feature of the present invention that the crop engaging elements are preferably moved at a relatively high speed.

In examples of preferred methods embodying the invention, a method of harvesting cereals may include moving the crop engaging elements relative to the frame at a speed such that the tip speed of the elements is in the range 10 to 25 m/s. In accordance with another preferred example, a method of harvesting lucerne (alfalfa) includes moving the crop engaging elements relative to the frame at a speed such that the tip speed of the elements is in the range 15 to 30 m/s.

It is a general preferred feature of the present invention that the crop engaging elements may enter the crop with minimum disturbance, and move upwardly through the crop to strip the required parts of the crop without the need for the crop to be supported in an upright position by any stationary guide members projecting forwardly of the said moving crop engaging elements. It is to be appreciated that there may be provided in some arrangements additional stationary lifting elements for raising the crop to the moving crop engaging elements in suitable manner where the crop is laid, but there is, at least in preferred embodiments of the invention, no requirement for stationary guide elements to hold the crop in the upright position during stripping in the vertical crop region swept by the crop stripping elements.

As has been mentioned, the guide means will normally consist of or include a hood or cover over the upwardly and rearwardly moving elements. It is preferred that the said hood may be moveable either closer to or further from the crop engaging elements, and/or around a curved path around the front of the path of movement of the elements. Where the elements are provided on a rotor, there may be provided a concave plate under the rotor, and this may also be adjustable, for example about a circular path centred on the axis of the rotor.

Particular advantage is obtained if there are provided means for adjusting the overhead hood, and an adjustable concave beneath a stripping rotor, since together these adjustments limit the intrusion of crop into the rotor space, and give control of the degree of stripping and the manner of stripping the crop.

In accordance with another feature of the invention, there may be provided means for adjusting the height of support means for the crop engaging elements, either together with the height of the overhead hood, or independently of the height of the overhead hood, to allow adjustment of the height at which the crop engaging elements enter the crop and move upwardly through the crop.

The present invention has a number of applications, particularly in the harvesting of grain. The stripped material can be collected into trailers or bulk containers for transportation to a central plant for processing. In the case of cereals and other seeds this may include completion of the threshing process and separation of the seed from material other than grain. Alternatively, particularly with cereals and other seeds, the stripped material may be fed directly into a processing machine, such as a combine harvester, for immediate threshing and cleaning. At a central plant or in the field the material other than grain may be collected loose or pressed for utilisation.

Generally, the invention finds application in the harvesting of mature seeds and grains, in the vining of peas and in the defoliation of annual and perennial crops as well as shrubs, incuding the non-destructive harvesting of leaves and shoots in one or repeated passes over the crop.

The present invention provides a number of advantages as a result of only the seed-bearing parts of cereal, pulse, herbage and other crops being collected for passage through a harvester, such as a combine harvester. Because less unwanted material is taken in, the work rate and output of the harvester can be greatly increased, sometimes by a factor of two or more. The straw left standing will dry quickly after rain and can be burnt easily and completely (if it is to be disposed of in this way), with the ash becoming uniformly distributed. If the straw is to be chopped for incorporation into the soil, comminution mechanisms can be more effective with standing straw than in windrowed straw because the stems are still attached to the ground. Even distribution of the chopped material is more easily achieved. If the straw is to be harvested, it can be readily cut by a windrower, for example attached at the front to a tractor which pulls and powers the harvesting machine at the rear. If desired the straw may be cut immediately by a mowing mechanism of known design mounted behind the stripping header.

Embodiments of the invention will now be described by way of example with reference to the accompanying drawing in which:

FIG. 1 is a diagrammatic side view in section of a crop row harvester embodying the invention;

FIG. 2 is a front, part-sectional view of the crop row harvester shown in the direction of arrows AA in FIG. 1;

FIG. 3 is a diagrammatic representation of a crop guide shown in FIG. 1 in the direction of arrows BB in FIG. 1;

Figure 5:
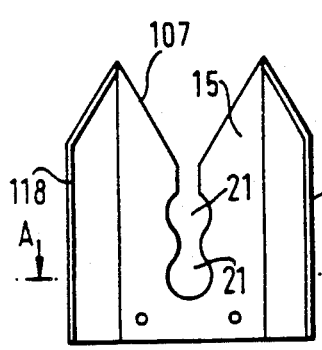
Figure 6:
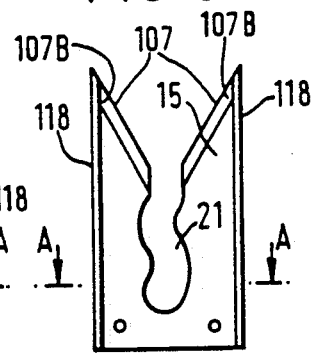
Figure 7:
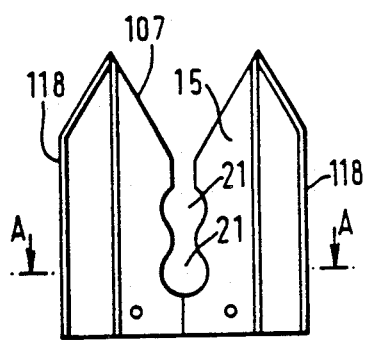

FIGS. 5, 6 and 7 show three forms of crop engaging element which may be used in the apparatus of FIG. 1 and FIGS. 5(a), 6(a) and 7(a), show respective sections along lines AA in FIGS. 5, 6 and 7;

FIGS. 8 and 8(a) show respectively diagrammatic plan and side views of a preferred form of crop stripper element which may be used in a row crop harvester embodying the invention, and FIG. 8(b) shows a sectional view of a support member for the element of one half of the crop stripper element and a support member for the element, in the direction of arrows AA in FIG. 8;

FIGS. 9 and 10 show respectively diagrammatic plan and sectional views of a further version of the element shown in FIG. 8.

Figure 11B:
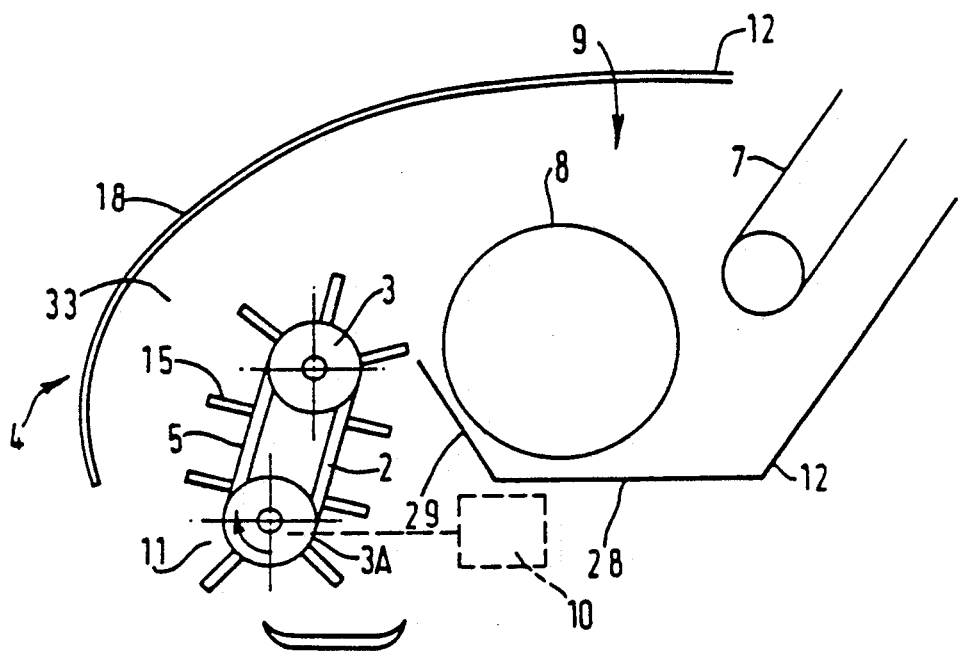
Figure 11C:
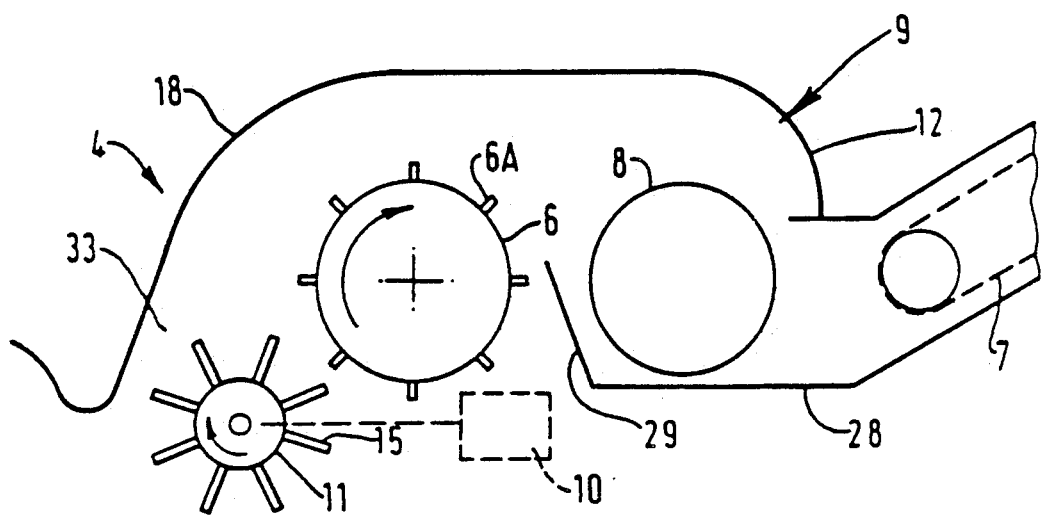
Figure 12A:
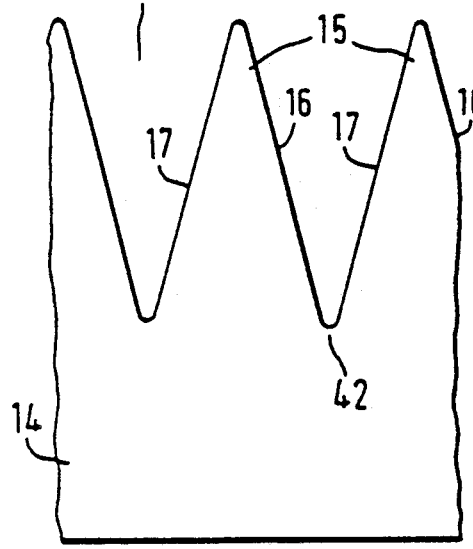
Figure 13:
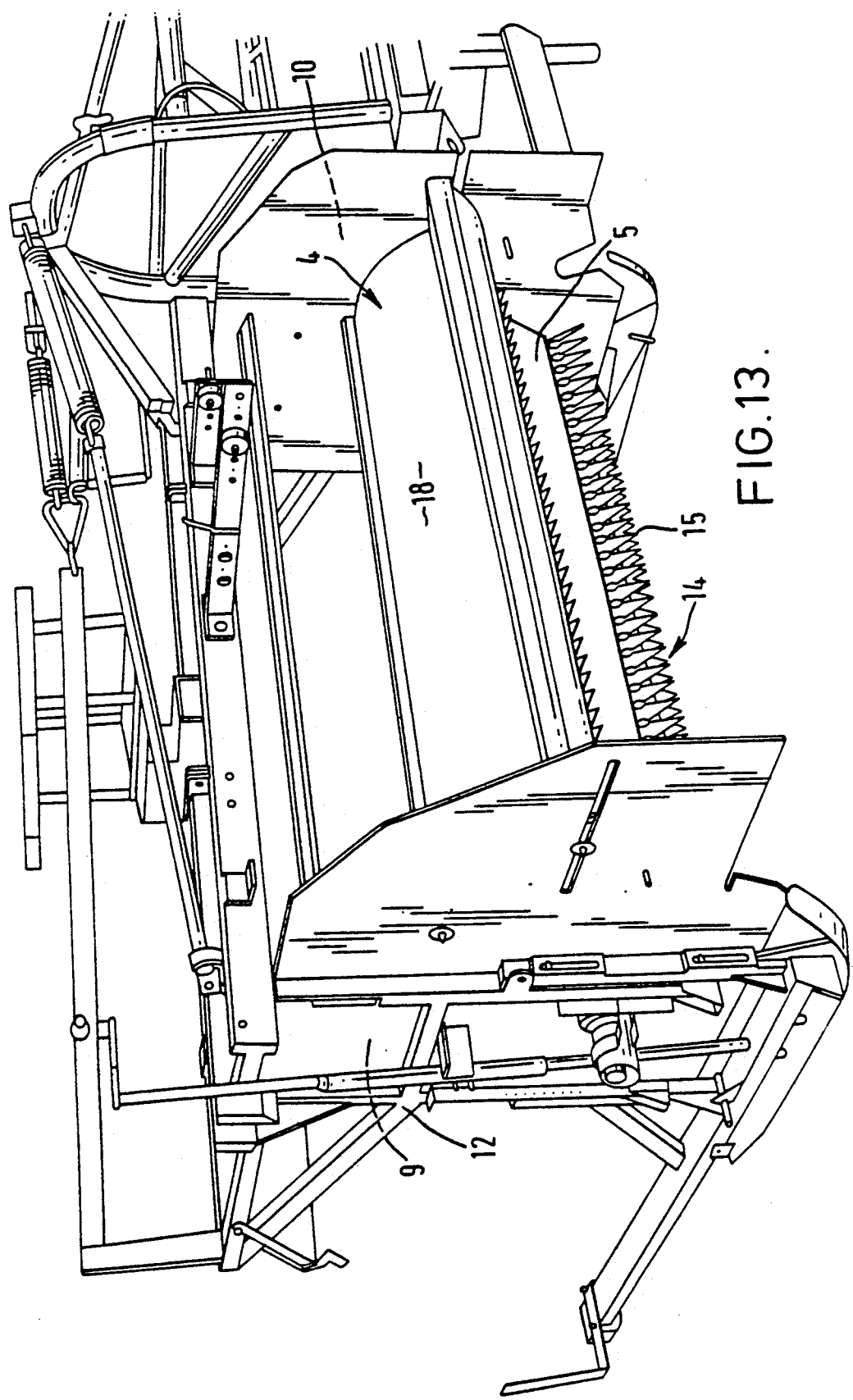
Figure 13A:
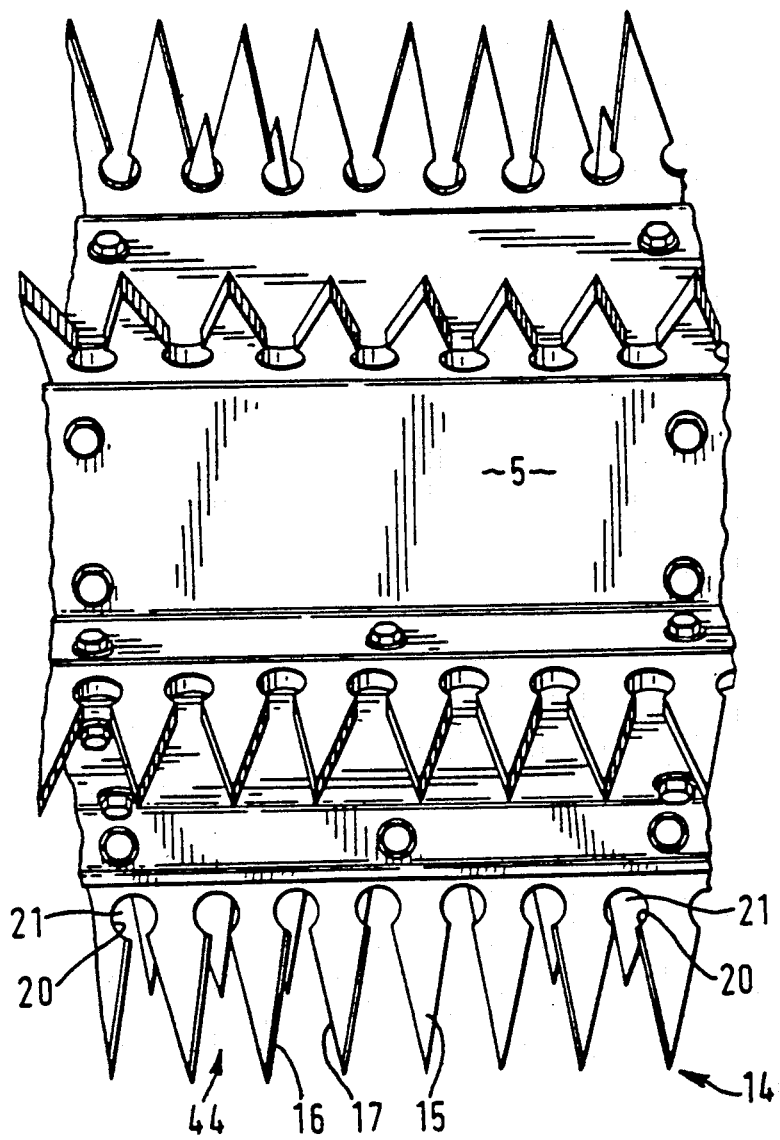
Figure 13B:
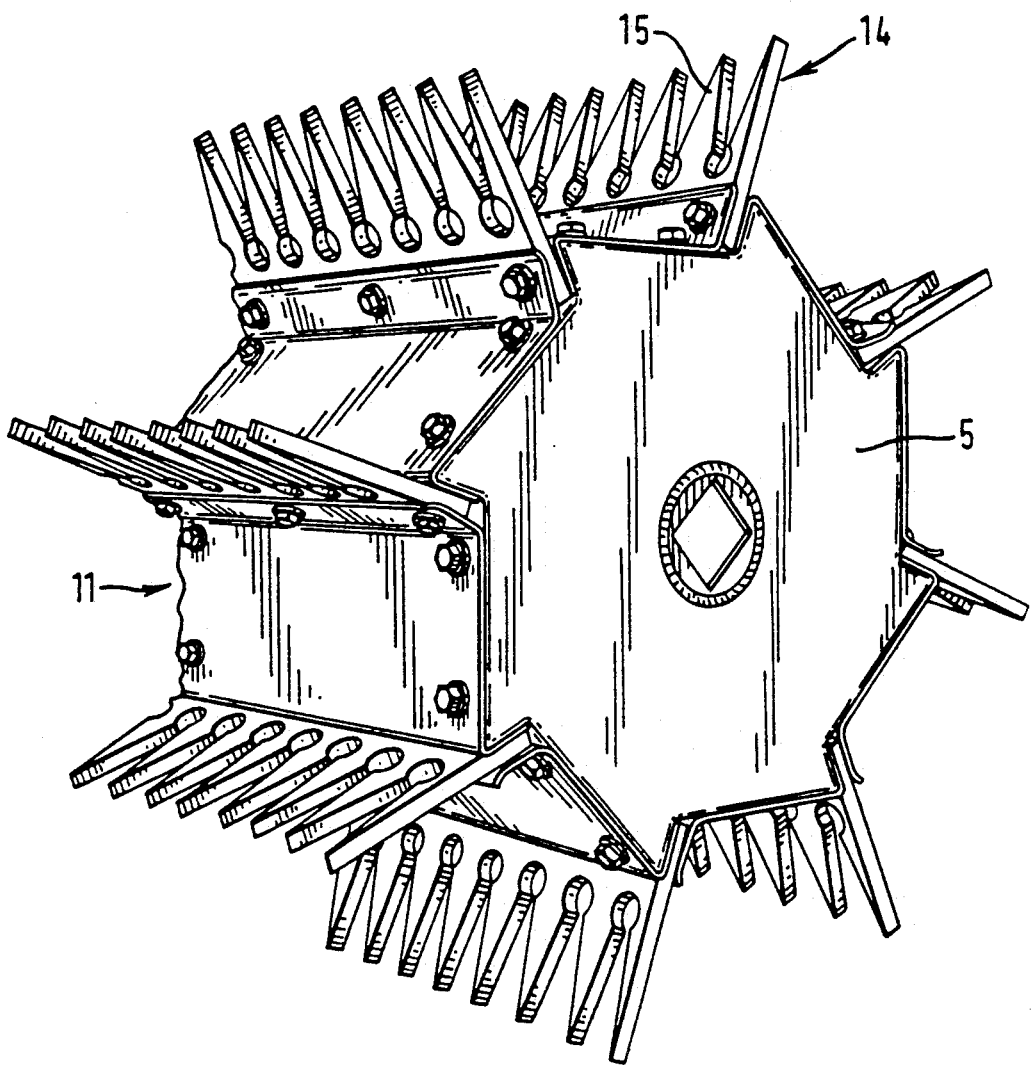
Figure 13B:
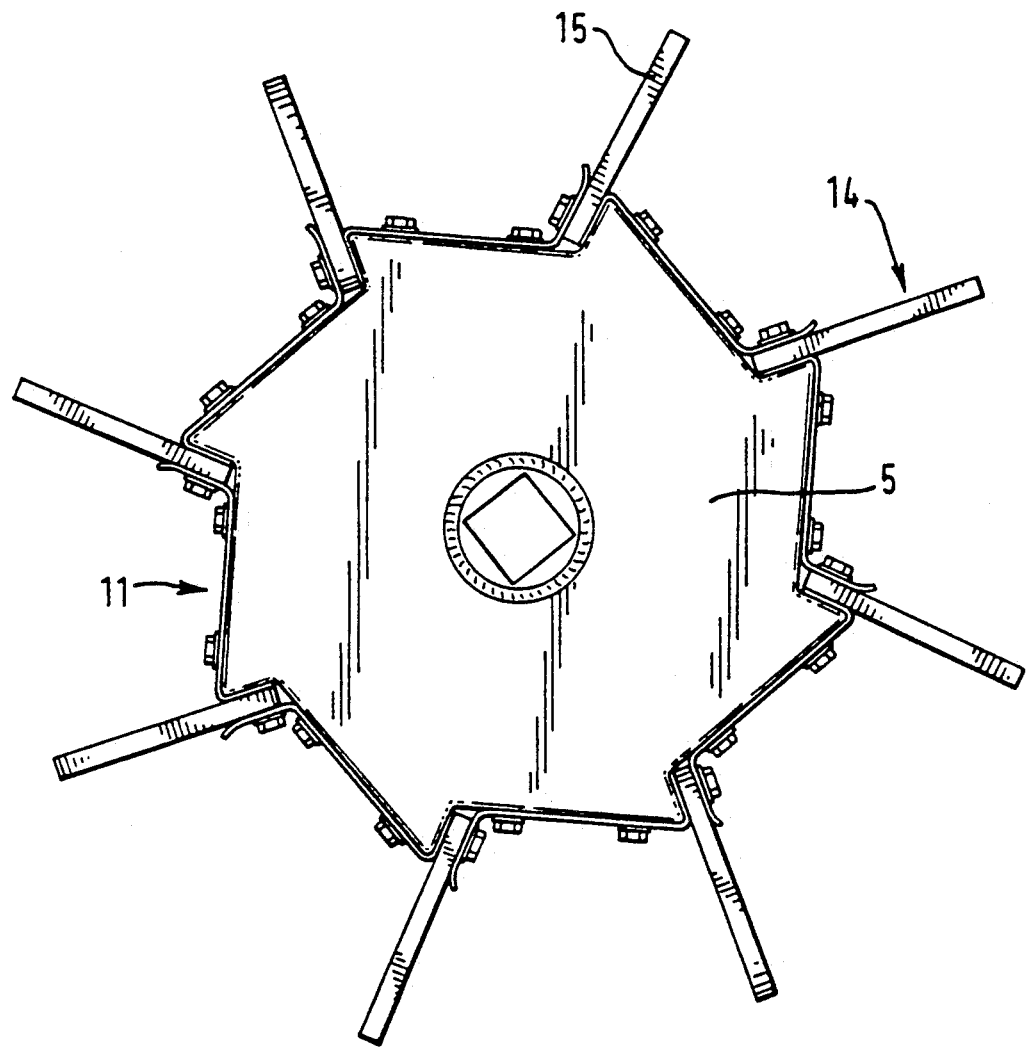
Figure 13D:
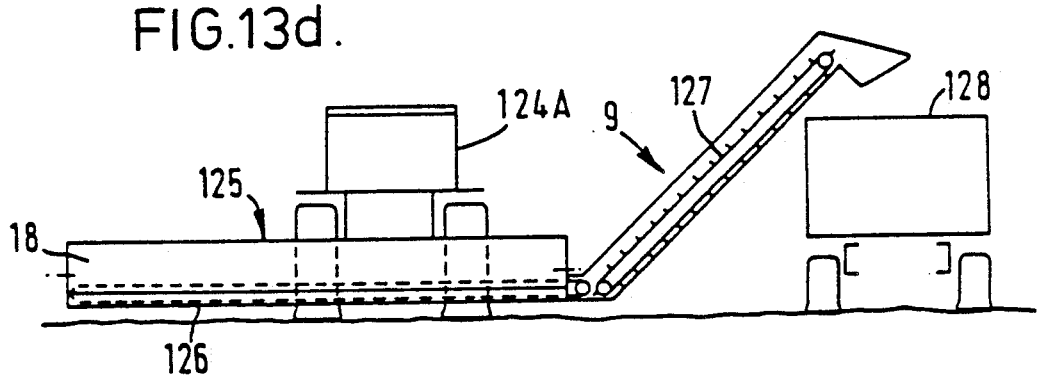
Figure 13E:
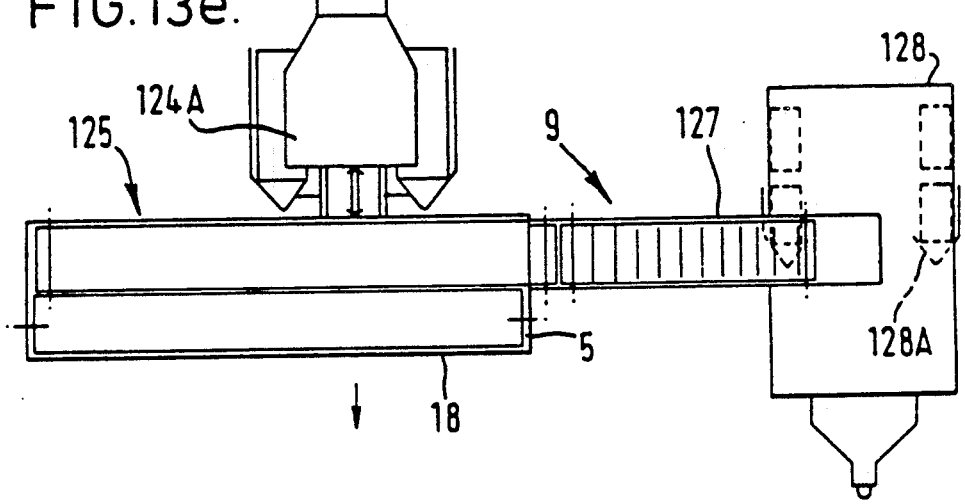
Figure 13F:
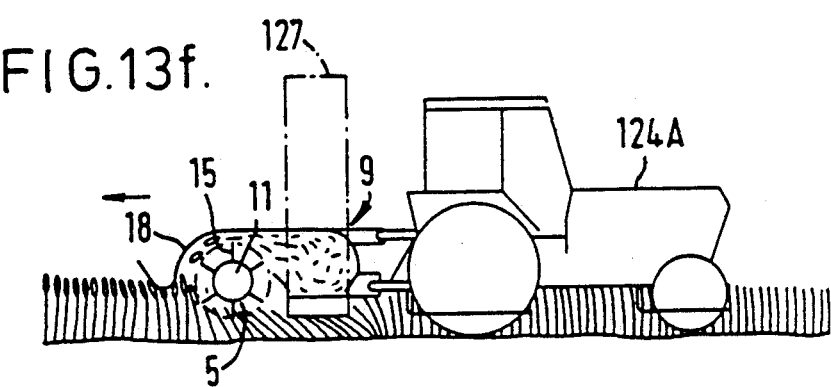
Figure 14:
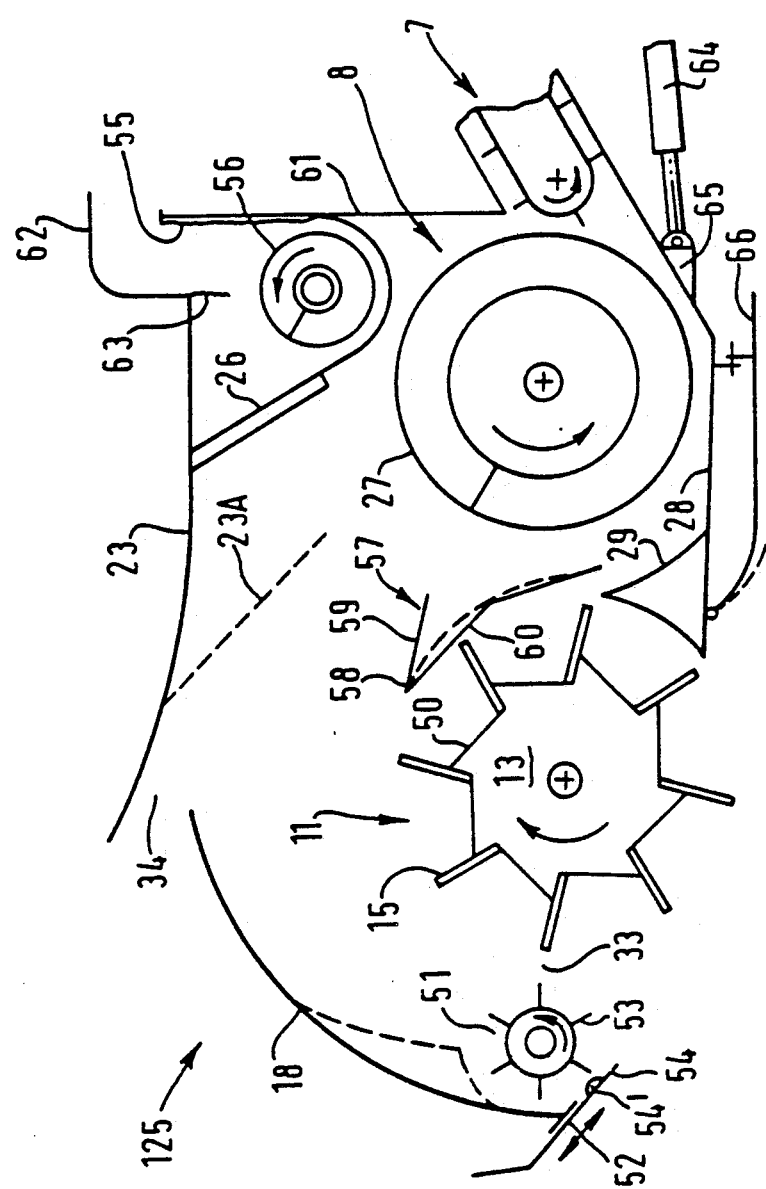
Figure 14A:
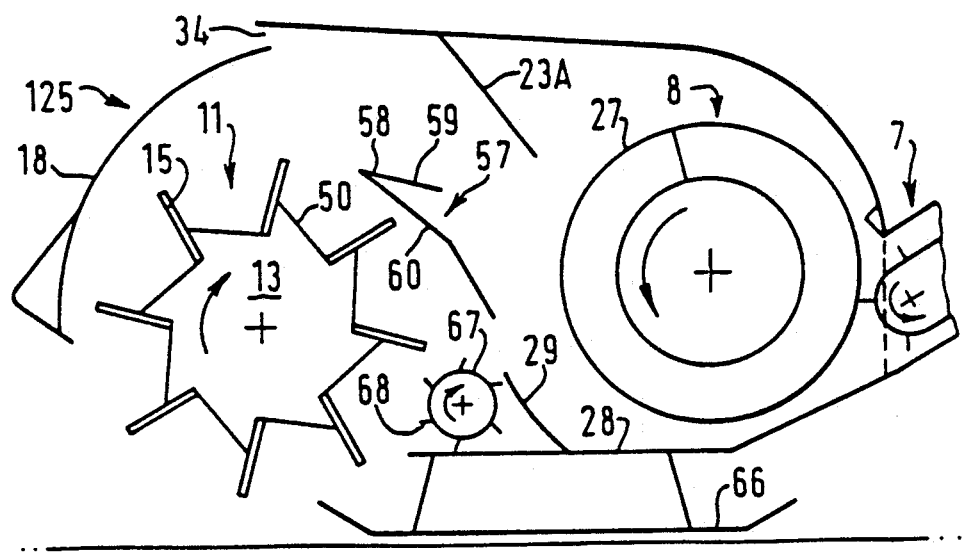
Figure 15:
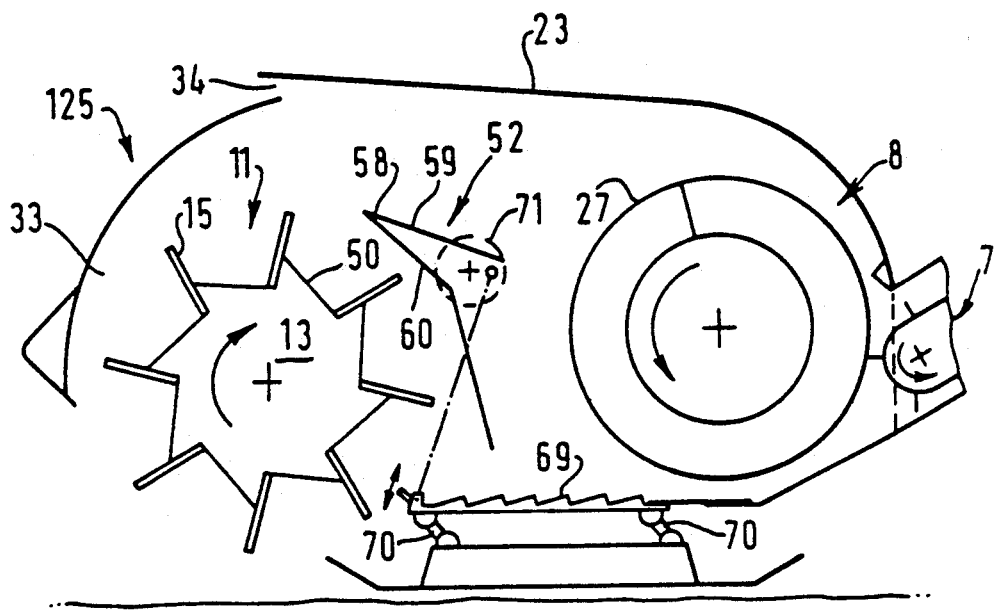
Figure 16:
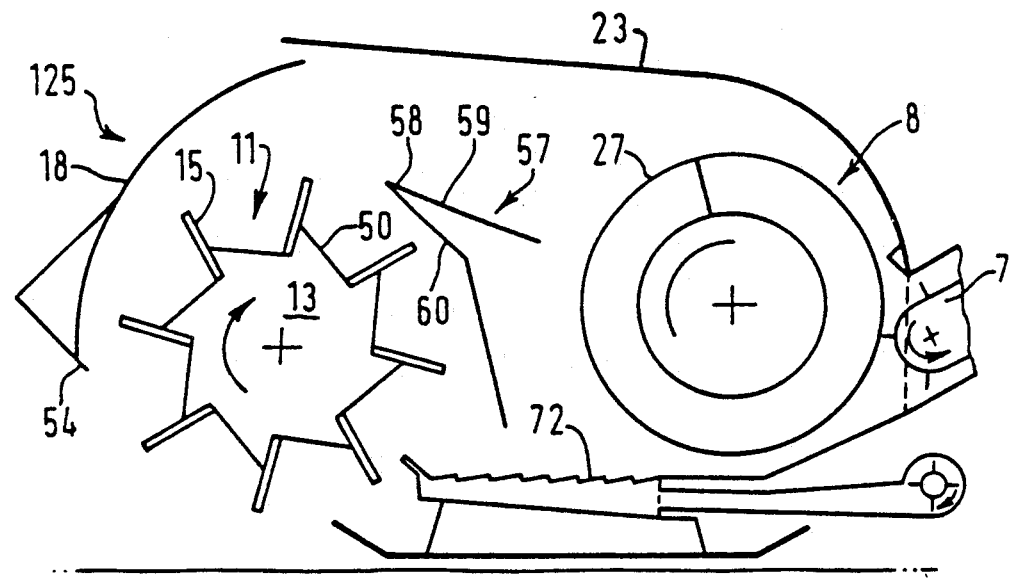
Figure 17:
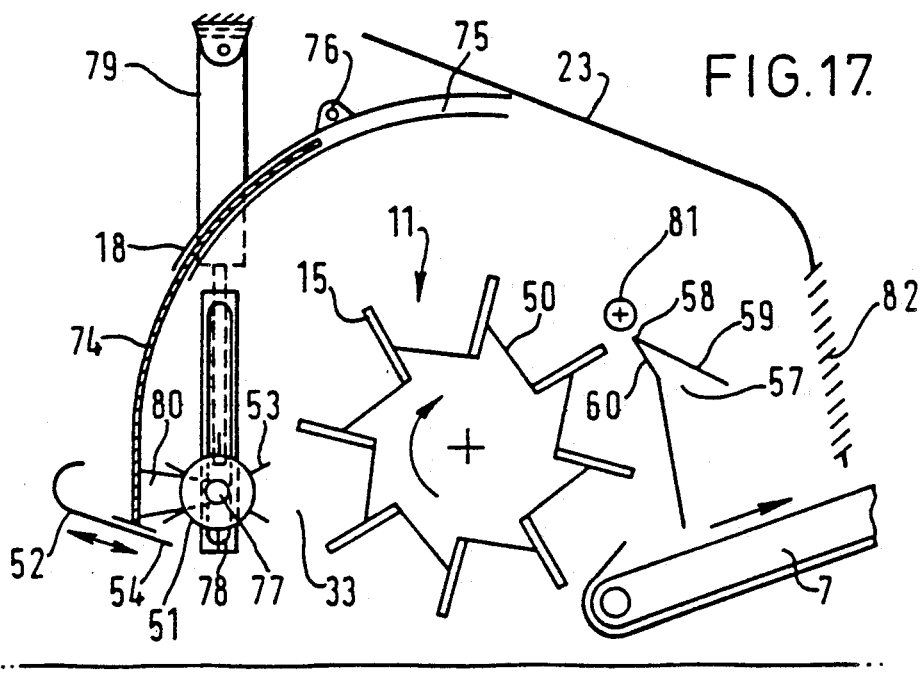
Figure 18:
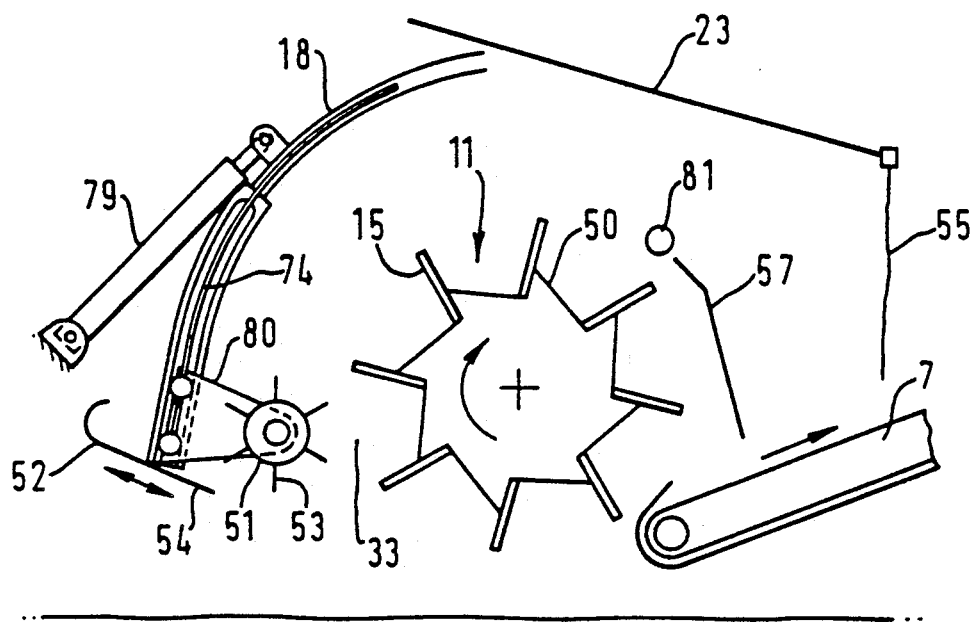
Figure 19:
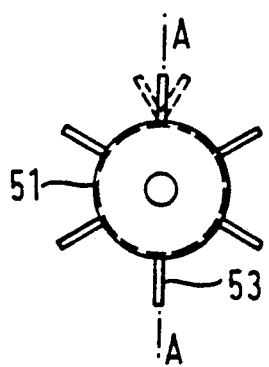
Figure 19A:
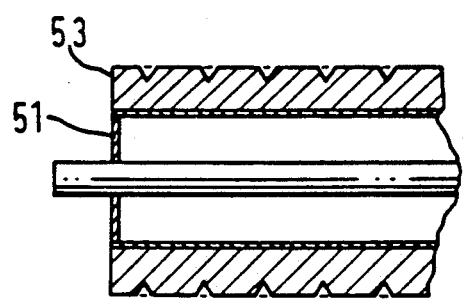
Figure 21:
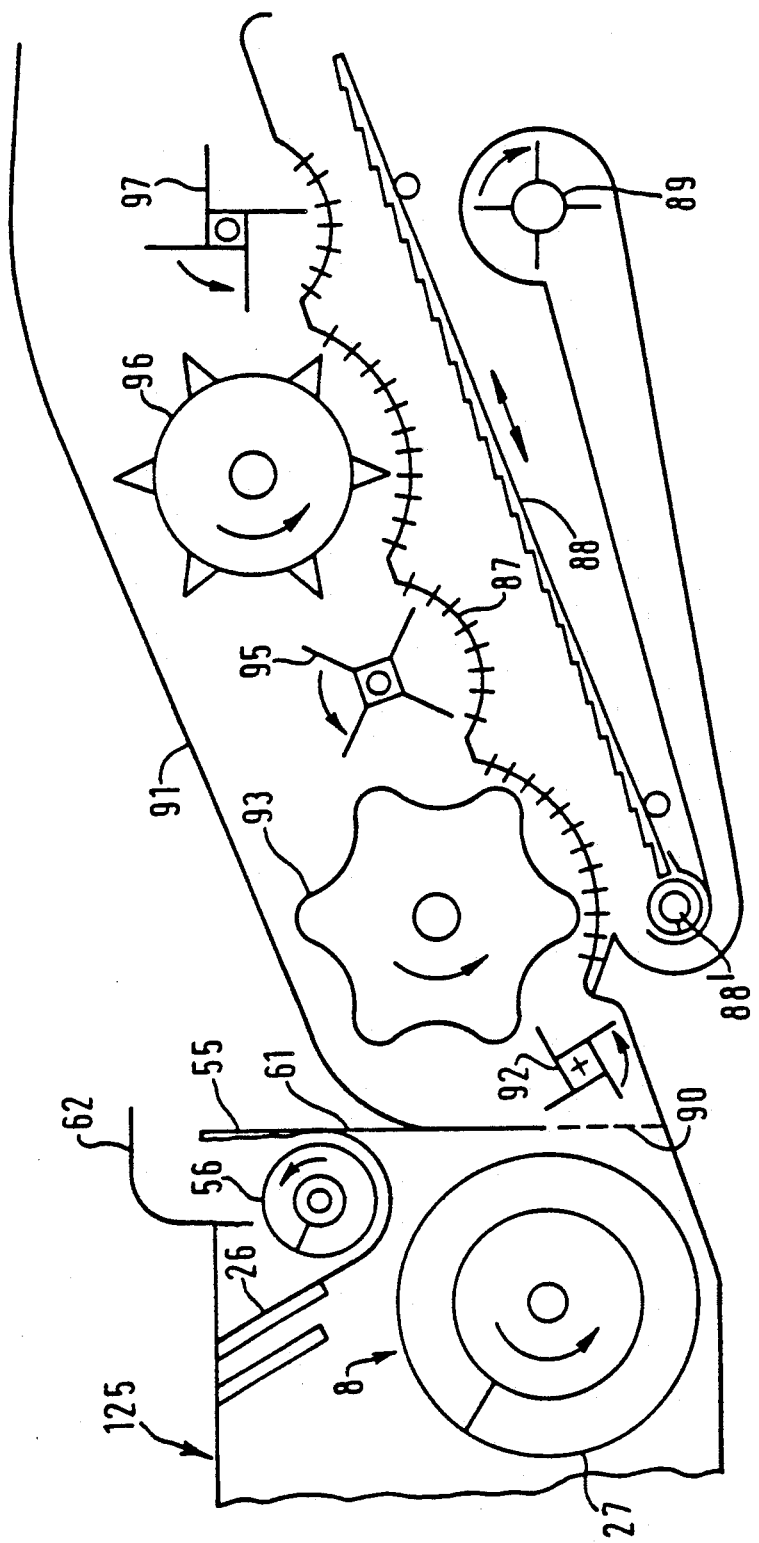
Figure 22:
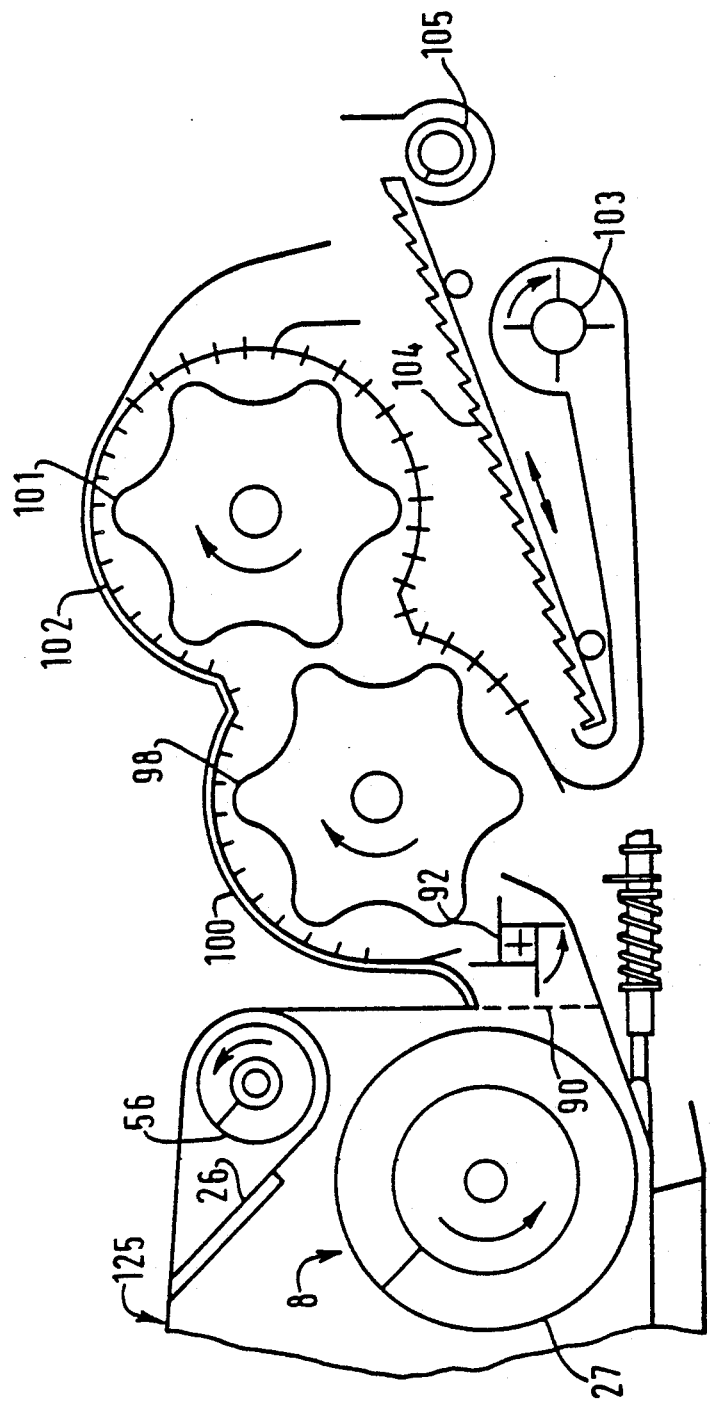
Figure 23:
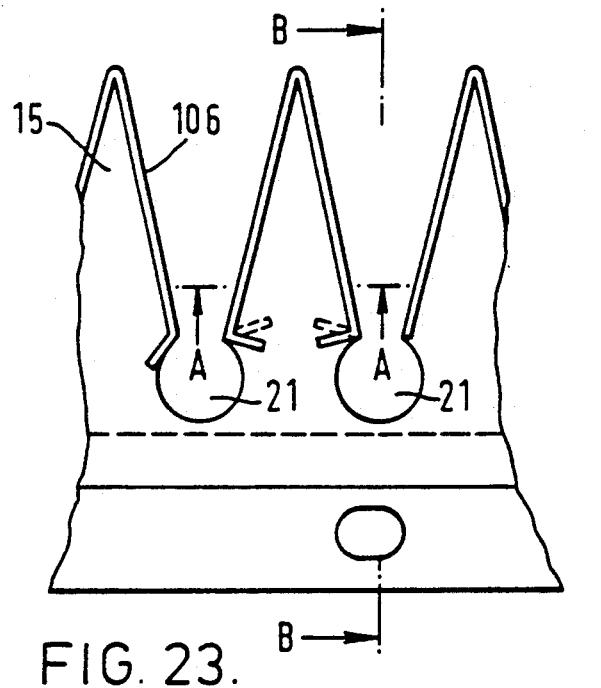
Figure 24:
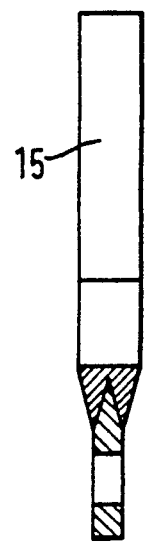
Figure 25:
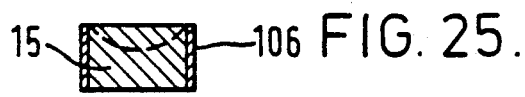
Figure 20:
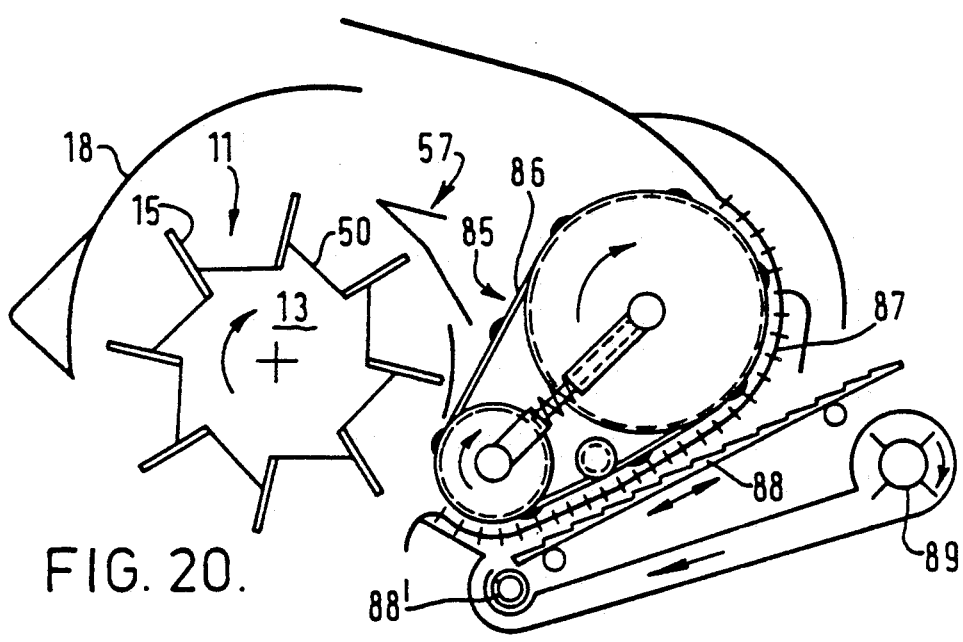

FIG. 11a is a diagrammatic side view in section of one general form of apparatus for harvesting crop, embodying the present invention;

FIG. 11b is a diagrammatic side view in section of an alternative general form of apparatus for harvesting crop embodying the invention;

FIG. 11c is a diagrammatic side view in section of a further alternative general form of apparatus for harvesting crop, embodying the invention;

FIGS. 12a to 12s show examples of different forms of crop stripping teeth embodying the present invention;

FIG. 13 is a perspective view from the front of crop harvesting apparatus embodying the invention, of the form shown generally in FIG. 11a;

FIG. 13a is a perspective view from the rear of part of the main rotor shown in FIG. 13;

FIG. 13b a perspective view of an end portion of the main rotor shown in FIGS. 13 and 13a;

FIG. 13b' is an end view of the rotor shown in FIGS. 13 to 13b;

FIG. 13c shows in diagrammatic side view, partly in section, a harvesting apparatus embodying the invention and generally in the form of a conventional combine harvester in which a stripping apparatus embodying the invention replaces the conventional cutting table of the combine harvester;

FIG. 13d is an outline front view of a stripping apparatus embodying the invention, delivering detached material onto a transverse belt conveyor and then onto a cleated-belt elevator for delivery into a bulk trailer;

FIG. 13e is an outline plan view of the apparatus shown in FIG. 13d;

FIG. 13f is an outline side view, partly in section, of the stripper harvester shown in FIG. 13d;

FIG. 14 is a diagrammatic side view in section of a modification of the apparatus of FIG. 11, embodying the invention, showing a preferred form of rotor cover and rotor;

FIG. 14a is a diagrammatic side view in section of a modification of the apparatus of FIG. 14, embodying the invention;

FIG. 15 is a diagrammatic side view in section of a modification of the apparatus of FIG. 11, embodying the invention, in combination with a jog-trough crop transfer arrangement;

FIG. 16 a diagrammatic side view in section of a modification of the apparatus of FIG. 11, embodying the invention, illustrating use of a self cleaning air floor for crop transfer;

FIG. 17 is a diagrammatic side view in section of a modification of the apparatus of FIG. 11, embodying the invention, showing a height adjustable auxiliary rotor at the front of the stripping rotor cover;

FIG. 18 is a diagrammatic side view in section of a modification of the apparatus of FIG. 17, embodying the invention;

FIGS. 19 and 19a are diagrammatic sectional views of an auxiliary rotor which may be used in the apparatus of FIG. 18;

FIG. 20 is a diagrammatic side view in section of a modification of the apparatus of FIG. 11, embodying the invention, in combination with a belt threshing mechanism;

FIG. 21 is a diagrammatic side view in section of a modification of the apparatus of FIG. 11, embodying the invention, illustrating use of a multi-rotor threshing mechanism;

FIG. 22 is a diagrammatic side view in section of a modification of the apparatus of FIG. 11, embodying the invention, showing co-rotating threshing drum arrangement;

FIG. 23 is a diagrammatic plan view of one form of crop engaging elements, which may be used in the invention, having metal edging strips; and FIGS. 24 and 25 show diagrammatic side and end views respectively of an element shown in FIG. 23.

Referring to FIG. 1 the apparatus comprises a mobile frame 12 on which is mounted a moveable support means which in the example shown is a rotor 11, carrying outwardly projecting crop engaging elements 15. The rotor 11 is driven in the so-called overshot mode so that the crop engaging elements 15 are moved in an upward direction at the front of the apparatus. Guide means co-operate with the crop engaging elements 15 to form a crop flow passage 33. In the example shown, the guide means are constituted by a hood or cover 18 which extends around at least part of the front half of the rotor and defines with the rotor elements 15 the crop flow passage 33 along which crop is conveyed by the rotor. The hood or cover 18 prevents forward projection of parts of the crop detached by the rotor 11.

In operation, rotation of the rotor 11 moves the crop engaging elements 15 so that the elements gather the crop and then move upwardly through the crop, gathering one or more crop stems. As the elements 15 reach the seed or fruit bearing parts of the crop the required parts to be detached are detached by rubbing and/or breaking and/or tearing the parts from the stems.

After the detachment, the required crop parts are conveyed upwardly and rearwardly over the rotor 11, and pass to crop conveying means positioned within a collecting trough 28 having a front wall 29 in close proximity to the rear of the rotor 11. Usually the crop transfer means will include means for transferring crop laterally, eg an auger 27, and means for conveying the crop rearwardly, eg a slatted chain conveyor 31.

Figure 4:
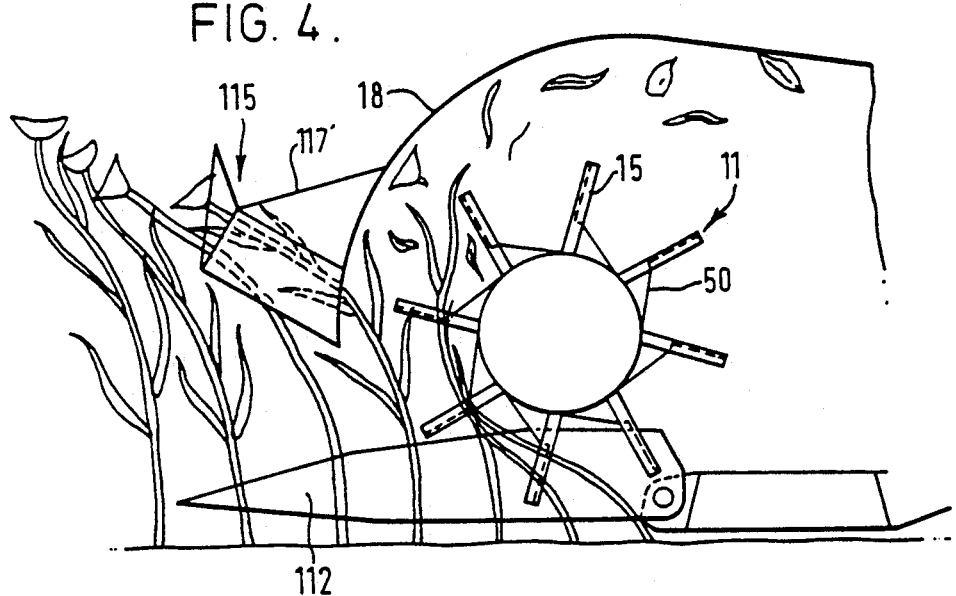
FIG. 4 shows in diagrammatic side view a front part of the apparatus of FIG. 1, when in operation.

FIG. 4 shows the apparatus of FIG. 1 in operation, and illustrates the sequence of guiding and stripping a row crop resembling a hybrid between maize and sunflowers. For such crops the stripping rotor diameter may be in excess of 1 m and that the number of transverse rows of stripping elements can be greater than the eight shown. The dimensions of the stripping elements may be adapted to suit specific applications, particularly the element length, the width to length ratio, the angle of the crop engaging edges, and the size and inclination of wings which may be provided along the outer sides of the elements.

With reference to FIG. 2, there is provision for the lateral spacing of the stripping elements on the rotor core to be adjustable, to adapt the rotor quickly and easily to different crops. For example, the elements may be located in transverse channels with provision for clamping or locking them in position. Moreover, the circumferential position of elements covering adjacent crop rows may be offset, so that the drive torque characteristic of the stripping rotor is smoothed out. That is to say, that the elements need not be positioned in straight rows parallel to the axis of rotation of the rotor.

Section AA of FIG. 1 is shown in FIG. 2 and indicates that the elements 15 are laterally spaced apart to coincide with the row spacing of the crop. Between sets of circumferentially aligned stripping elements 15 there is provided hingedly attached to the front of the harvester table a divider assembly 112 which protrudes forwardly into the spaces between crop rows. The dividers 112 have the purpose of deflecting upwardly and sideways any crop stems or parts which are misaligned in respect to the stripping elements 15. It is arranged that the stripping rotor 11 and hood 18 can be raised and lowered independently of such dividers 112 above a minimum setting.

As shown in FIG. 2, there may optionally be attached to the main body of the crop divider 112 a central, upwardly projecting bow divider 113. At the sides are rearwardly and upwardly extending crop guides 114, which may be provided with angular adjustment. Attached to the front of the lower hood section 18 are optional upper crop guides 115 whose lateral spacing also coincides with the row spacing. At the front of each upper crop guide 115 is a flared intake section 116. The apex of the cross-sectional shape of an upper guide 115 lies on the vertical plane which passes through the centre of the recesses 21 in the stripping elements 15. FIG. 3 shows a section through the upper crop guide 115 in the direction of arrows BB in FIG. 1. A support strut 117 above the upper crop guide 115 may be designed to adjust the inclination of the guide 115.

It should be noted that the crop dividers can take many forms and may be pivoted or suspended in many different ways. They may be provided themselves with ground-engaging skids.

Figure 5A:
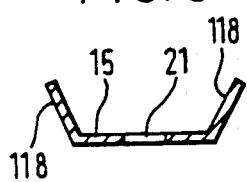

In FIGS. 5 and 5(a) is shown a stripping element 15 for row crops which produce large fruiting bodies or seed heads, or a large bulk of foliage needing to be detached. To accommodate the crop bulk and minimise the risk of loss, a large flared wing 118, set at a suitable angle to the horizontal, is provided on each side. The central recess can have more than one relief aperture 21, to ensure stripping of wanted crop parts from the "sheltered" stem region and to cause lateral "agitation".

Figure 6A:
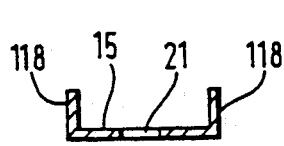

In FIGS. 6 and 6(a) is shown a row crop stripping element 15, also of large dimension but with wings 118 which are perpendicular to the plane of the element 15 and may be dimensioned to meet the requirements of specific crops. Converging crop-engaging edges 107 are provided with a ramp-shaped lip 107B (not shown in cross-section, but similar to that shown at 107B in FIG. 10), to increase the upward angle of the trajectory of detached crop parts on leaving the element under centrifugal effect. The central recess 21 is shaped to be wavy, to impart a lateral agitation to the crop stems and at the same time provide re-entrant edges for more complete stripping.

Figure 7A:
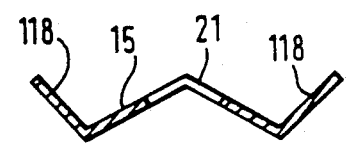

FIGS. 7 and 7(a) show further modifications of the element of FIG. 5, in which the central transverse surfaces of the element 15 are inclined upwardly at the centre, that is to say forwardly relative to the direction of movement of the element through the crop.

FIGS. 8 to 10 show further modified forms of crop stripping elements which may be used.

FIG. 8 shows large stripper paddles 15 which may be up to 300 mm in overall length, or even longer for specific purposes and crops. The paddles 15 form a pronounced flared entry region by edges 107, so as to guide for example row crops into a subsequent narrower stripping section bounded by edges 107A, which is followed optionally by a relief aperture 21 bounded by edges 20 of circular or other shape. As shown in FIG. 8(b), which is a cross-sectional view on arrows AA in FIG. 8, the paddles have pronounced upstanding ribs 108 at the sides, and optionally at the leading flared edges there may be integral ramp-shaped upward protrusions 107B as shown in FIG. 8. Beneath them, near their working edges, the paddles 15 are supported and strengthened by, for example, angle-section members 110 as shown in FIG. 8(b). At their base the paddles are fastened to suitable brackets, fins or other supporting elements on the rotor core. This form of stripping element finds particular application in the harvesting of such crops as grain maize, sunflowers, Brussels sprouts, sugar beet seed, and other stiff crops with stem cross-sectional dimensions substantially larger than cereal and other small seed crops.

In FIG. 9 is shown a type of stripping element 15 which is particularly suitable for intermediate crops, whether grown in rows or not. Examples of such crops are field beans and oil seed rape. The dimensions of the elements 15 can be adapted to suit specific requirements. Essentially each element 15 forms a small impelling paddle which has an optional raised, ramp-shaped rim 107B surrounding it along the crop-engaging edges. The purpose of the integral ramps 111 is to allow particles to escape freely but to direct them into more steeply inclined trajectories for more positive recovery. This is particularly important in crops which are at the point of shedding and which have seeds or other wanted parts in the lower stem regions. Between adjacent elements there may be optional relief apertures of suitable design. FIG. 10 is a section in the direction of arrows BB in FIG. 9. The slope of the ramp-shaped rim section 108 may be from approximately 15° to 45°, or steeper.

The ramp-shaped edges are provided by additional plastics material which increases the wear resistance in the edge region and causes crop particles leaving the elements under the effect of centrifugal force to be directed into more steeply inclined trajectories for more positive recovery. The edges have particular relevance in the context of moulded stripping elements made from resilient material. The edges are provided for influencing the trajectory of the detached crop parts in the impelling phase of previously collected material. One advantage of the crimped or raised edges, is that by these means radially mounted elements may be caused to achieve the effects of forwardly inclined elements.

There will now be described a number of embodiments of the present invention in its second, broad, independent aspect.

Throughout this specification, corresponding components of the various arrangements shown are indicated by like reference numerals. For simplicity, the functions and inter-relationships between the various components are not described in connection with each figure when these have been described previously. It is particularly to be appreciated that where corresponding components have like reference numerals, the appropriate description applies equally each time those elements are referred to.

Referring first to FIG. 11a there is shown in diagrammatic side view the generalised layout of an embodiment of the present invention for harvesting crop. The apparatus comprises a mobile frame for movement over the ground, indicated generally at 12. Mounted on the frame 12 is a moveable support means 5 which in the example shown is a rotor 11, although other support means may be used such as a conveyor belt.

Mounted on the rotor 11 are a plurality of outwardly projecting crop engaging elements 15, which may take a number of forms in accordance with the invention, as has been described hereinbefore or will be described hereinafter.

The rotor 11 is driven by drive means indicated diagrammatically at 10 which may conveniently comprise a gear box and power train driven by a tractor, or other power source such as the engine of a combine harvester. The rotor 11 is driven in the so-called overshot mode so that the crop engaging elements 15 are moved in an upward direction at the front of the apparatus. There are provided guide means 4 co-operating with the crop engaging elements 15 to form a crop flow passage 33. In the example shown, the guide means 4 are constituted by a hood or cover 18 which extends around at least part of the front half of the rotor and defines with the rotor elements 15 the crop flow passage 33 along which crop is conveyed by the rotor. The hood or cover 18 prevents forward projection of parts of the crop detached by the rotor 11.

In operation, rotation of the rotor 11 moves the crop engaging elements 15 so that the distal tips of the elements enter the crop with minimum disturbance of the stems 19 of the crop. The elements 15 then move upwardly through the crop, gathering one or more crop stems. As the elements 15 reach the upper parts of the crop the required parts to be detached are detached by rubbing and/or breaking and/or tearing the parts from the stems.

After the detachment, the required crop parts are conveyed upwardly and rearwardly over the rotor 11, and pass to crop conveying means indicated generally at 9, and positioned within a collecting trough 28 having a front wall 29 in close proximity to the rear of the rotor 11. Usually the crop transfer means 9 will include means for transferring crop laterally, indicated diagrammatically at 8, and means for conveying the crop rearwardly, indicated diagrammatically at 7. Conveniently the transverse crop transfer means 8 may be an auger, but may alternatively be a transverse conveyor belt. Conveniently the rearward crop transfer means 7 may be a conveyor, for example a slatted chain conveyor, although other means may be provided.

In FIG. 11b there is shown in diagrammatic side view the generalised layout of an alternative embodiment of the present invention, also for harvesting crop. The apparatus again comprises a mobile frame 12 for movement over the ground, and mounted on the frame 12 is a moveable support means 5 carrying a plurality of outwardly projecting crop engaging elements 15, which may take a number of forms in accordance with the invention, as has been described hereinbefore or will be described hereinafter. Except for the moveable support means 5, the other components of the apparatus of FIG. 11b correspond generally to those shown in FIG. 11a, and in general the description given with regard to FIG. 11a applies also to FIG. 11b.

The moveable support means 5 in the apparatus of FIG. 11b comprises a conveyor 2 mounted for movement around two sets of pulleys or other guides 3 and 3A. The elements 15 are mounted on the conveyor 2, which is driven by drive means indicated generally at 10, in a direction such that the elements 15 move upwardly and rearwardly at the front of the apparatus.

In FIG. 11c there is shown in diagrammatic side view the generalised layout of a yet further alternative general form of the present invention for harvesting crop. Again, in general the components shown in FIG. 11c correspond to those shown in FIGS. 11a and 11b, the only difference being in the form of a moveable support means 5 which is provided. Again, the description which has been provided with regard to FIG. 11a is in general applicable also to the apparatus of FIG. 11c.

In FIG. 11c the moveable support means 5 is provided by a rotor 11 of smaller diameter than that shown in FIG. 11a, and this rotor operates in close co-operation with a second rotor 6 (in the example a conveying drum), which is provided to the rear of and above the stripping rotor 11. The second rotor 6 carries crop conveying elements 6A (in the example relatively shallow ribs extending across the width of the drum, and spaced around its circumference). In the embodiment of FIG. 11c, the functions of stripping and conveying which in FIG. 1a are carried out by the rotor 11, are divided between the rotors 11 and 6, with the rotor 11 being provided chiefly for stripping crop, and the rotor 6 being provided for conveying the crop upwardly and rearwardly over the rotor 6 to the crop transfer means 8 at the rear of the apparatus and to prevent crop wrapping around the rotor 11. As an alternative to shallow ribs, the rotor 6 may be fitted with deeper ribs of serrated profile, to intermesh in an overlapping mode with the combs on the rotor 11. In that form it positively prevents wrapping of crop around the rotor 11, even if the rotor has a smaller diameter than shown. As with the arrangements of FIGS. 11a and 11b, the embodiment of FIG. 11c may utilise any of the forms of crop stripping elements described hereinbefore or as will be described hereinafter, and may also utilise any features of the invention described herein.

It is particularly to be appreciated that the arrangements of FIGS. 11a, 11b and 11c indicate general layouts of apparatus embodying the invention, and that the various components shown may be provided in practice by any of the appropriate components which have been described hereinbefore, or are to be described hereinafter.

Referring now to FIG. 11a, and FIGS. 13, 13a, 13b, and 13b', there is shown one form of a crop stripping apparatus embodying the invention, which conveniently may be used as a header for a combine harvester, or may be used in conjunction with other threshing and grain separating apparatus.

The apparatus comprises a rotor 11 mounted in a main frame 12 for movement through the crop to be harvested. The rotor 11 comprises an inner core 13 generally in the form of a circular section or, preferably, flat-sided core (to be described further hereinafter), and a succession of transverse combs 14 spaced circumferentially around the rotor 11.

As shown in FIGS. 13, 13a, 13b, and 13b', each comb 14 maybe formed from a transverse rib of solid material shaped to provide an array of teeth 15 mounted in a row transverse to the direction of movement of the harvesting apparatus through the crop. Each tooth 15 has side edges 16 and 17 which diverge from each other in a direction away from the distal tip of the tooth 15.

There is provided at the junction of each adjacent pair of side edges 16 and 17 of adjacent teeth 15, an enlarged aperture 21, which in the example shown, is part circular. Each aperture 21 is formed by relieved portions of adjacent teeth at the base regions thereof Thus each tooth has a portion at or in the region of its base which is narrower than the widest part of the portion which has diverging side edges. In the examples shown, each comb is formed from a flat sheet-like rib of solid material, having cut therein, or otherwise formed, a series of keyhole shaped apertures, forming the said teeth.

The rotor 11 is driven to rotate in the so-called overshot mode, so that the combs 14 are moved in an upward direction at the front of the apparatus. There is provided over the front of the rotor 11 a hood or cover 18 to prevent forward projection of parts of the crop detached by the rotor 11.

In operation, rotation of the rotor 11 moves the combs 14 so that the narrow or pointed distal tips of the teeth 15 enter the crop with minimum disturbance of the stems 19 of the crop. The teeth 15 then move upwardly through the crop, gathering between adjacent side edges of adjacent teeth one or more crop stems. As the teeth 15 reach the seed-bearing heads of the crop, the seeds, or seed heads, are detached by rubbing the seeds free, or snapping off the seed heads. The seeds and seed heads are removed by engagement of the crop with the side edges 16 and 17 of the teeth, and by engagement with the edges 20 of the apertures 21 at the base of the junctions of adjacent side edges 16 and 17.

An upturned leading portion 32 of the cover usually engages crop first during forward movement of the apparatus. The upturned leading portion 32 of the rotor cover 18 engages the crop and preferably seals off the crop passage 33 immediately in front of the overshot rotor 11.

Material including grain and grain heads is dislodged and then impelled upwardly and rearwardly along the passage 33, by the effect of the combs 14. The overhead hood 18 is important in avoiding forward projection of grain and grain heads. The hood produces a funnel effect so that grain is guided into the machine rather than being ricochetted back onto the ground.

The stripped crop stems 19 pass under the machine and remain standing in the field. To avoid straw being pressed into the ground by tractor or machine wheels, dividers may be fitted in front of the wheels to force the crop residue apart temporarily.

It will normally be necessary to provide means for adjusting the height above ground of the stripping rotor 11 so as to be at the correct height in relationship to the height of the seed-bearing heads or other required parts of the crop. The height above the ground of the stripping rotor unit alone may be varied, or the height of the whole header arrangement may be varied according to conditions. For example, the rotor will need to be lowered in order to gather the desired material efficiently where crops are exceptionally short or laid. Proximity sensors may be attached at the front of the stripping rotor cover 18, and the output signal may be used to keep the rotor height adjusted automatically in relation to the crop horizon and/or to adjust the height of the rotor cover.

It should be noted that by adjustment of the speed of the combing ribs 14, together with appropriate arrangements of the geometry of the components, selective harvesting of only the ripest seed, particularly of herbage seed, may be effected during successive passes of the crop.

The present invention provides a number of advantages, in particular where the invention is applied to stripping grain from standing crop such as wheat, barley and oats. Grain stripping of standing crop leaves the straw standing rather than leaving cut straw from a combine harvester. The standing straw is easier to chop for subsequent disposal, than is the randomly orientated cut straw which is left spread or in spaced windrows by a combine harvester. Grain crop harvested in accordance with the present invention can, at least in preferred embodiments, have a higher proportion of grain to material other than grain, compared with the material collected by a combine harvester. In consequence higher work rates become possible, because in a combine harvester these are related principally to the throughput of straw. Finally, at least in preferred embodiments, the apparatus often leaves less wasted grain and grain heads in the field than does a conventional combine harvester.

FIGS. 12a to 12j show a number of alternative forms of the combs 14 which may be used on the stripping rotor 11. In FIG. 12a a comb 14 consists of plain, deep serrations forming the teeth 15. The junction 42 between adjacent side edges 16 and 17 of adjacent teeth 15 is slightly radiused as a recess to avoid crop becoming wedged therein. Normally the combs 14 are arranged so that successive teeth 15 follow the same peripheral path, but in some arrangements it may be advantageous laterally to offset alternate combs 14 by half the tooth pitch.

Figure 12B:
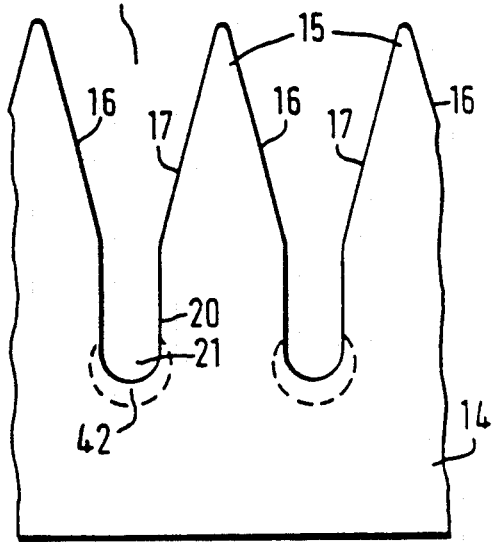

In the comb 14 shown in FIG. 12b the gap or recess 44 between each pair of adjacent teeth 15 is extended at the narrowest point between adjacent side edges 16 and 17 to terminate in an elongate slot 21. The end of each slot 21 may be relieved as shown in dotted lines to aid withdrawal of stripped stems and avoid interference with incoming crop.

Figure 12G:
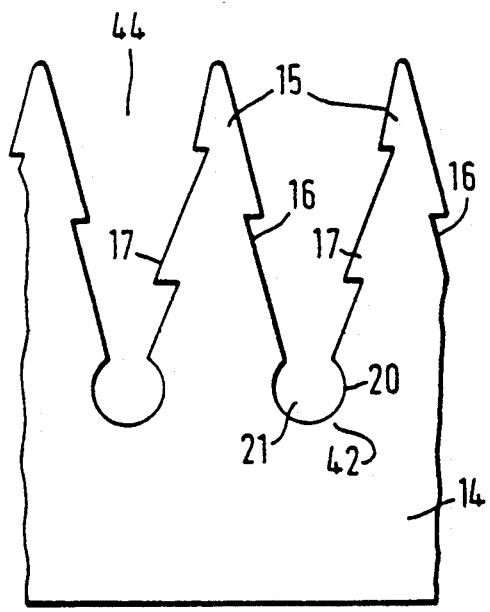
Figure 12H:
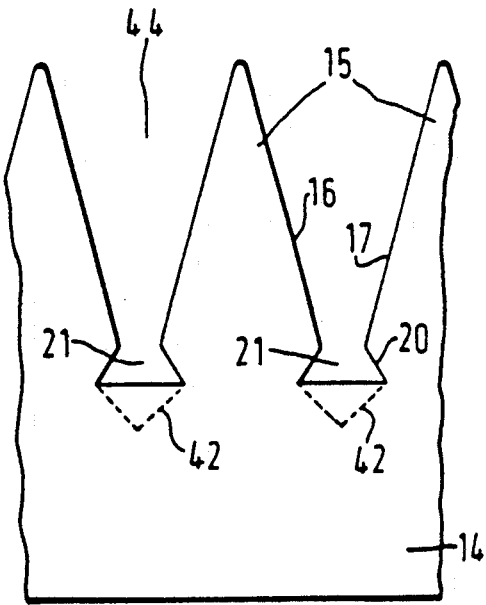
Figure 12C:
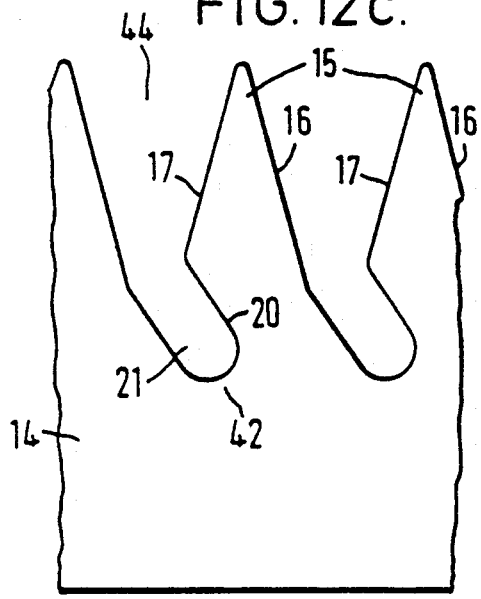

In FIG. 12c the slots 21 of the recesses 44 are directed to one side, which aids stripping of seeds off the forward pointing side of stems or seed heads. In an arrangement such as shown in FIG. 12(c) alternate combs 14 around the circumference of the rotor may be mounted so that the slots 21 point in opposite directions. The slots 21 may be relieved at their innermost end, as shown in FIG. 12(b).

Figure 12D:
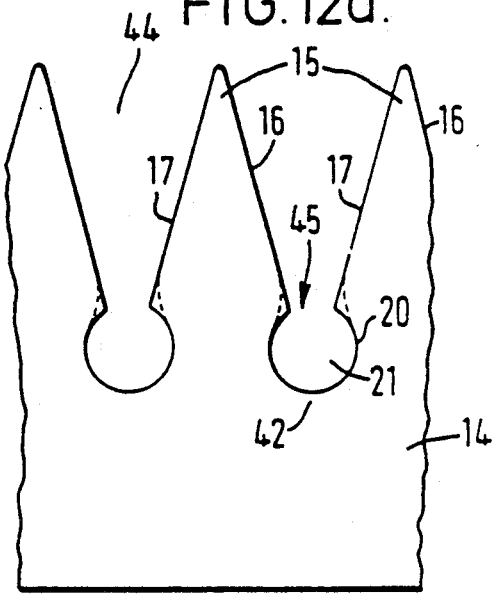

FIG. 12d shows the most preferred form of comb for stripping cereals and small seeds and for defoliating legumes. The teeth 15 have generally the shape of an arrow head, the recess 44 between adjacent pairs of teeth having generally the shape of a keyhole. The distance between the closest points of the adjacent side edges 16 and 17, indicated in the region 45, frequently determines the amount of extraneous matter being collected with the seeds and other required material. The relief apperture 21 at the inner end of the recess 44, again promotes stripping of seeds on the leading face of seed heads and facilitates the withdrawal of stems after stripping. The side edges 16 and 17 may be rounded at the narrowest part of the recess 44 as shown in dotted lines.

Figure 12E:
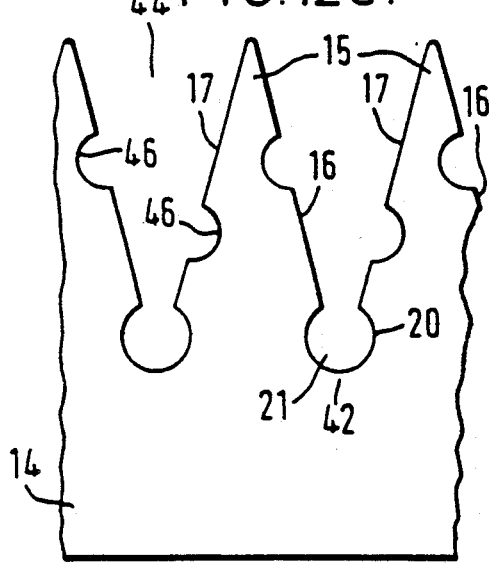
Figure 12F:
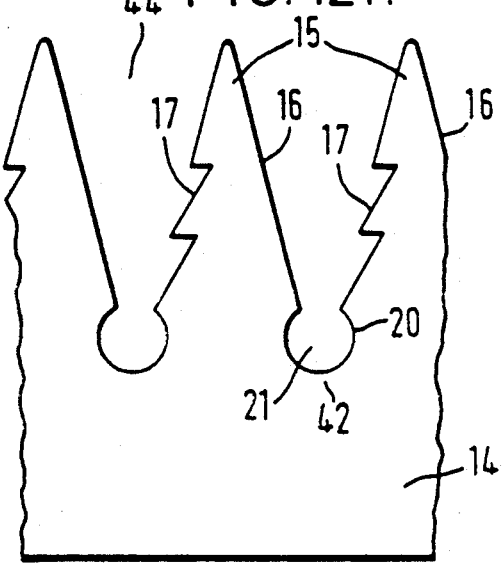

In FIG. 12e the rubbing edges 16 and 17 of the teeth 15 have been recessed at 46 to help treat the forward face of crop heads and to achieve effective stripping in particularly tough crops. In FIG. 12f an alternative arrangement is shown in which some edges of teeth are serrated. Where only one side edge is serrated as in FIG. 12f, it is preferred to reverse the directions of alternate combs 14 around the circumference of the rotor 11. FIG. 12g illustrates yet another alternative design in which both side edges of each tooth 15 are serrated. FIG. 12h shows alternatively shaped relief spaces at the base of the recesses between stripping teeth.

In FIG. 12j there are shown teeth 15 having apertures 21 which are inclined in one direction, followed by teeth shown in dotted lines, 15′, in the next following row of teeth, inclined in the opposite direction. The succeeding combs of teeth 15 shown in FIG. 2j are offset to a greater extent so that the outwardly projecting tips overlap. If alternate stripping rib elements are optionally moved laterally, for example by sliding them inside a retaining channel as will be described hereinafter, then the dimensions of the intake funnels and of the stripping recesses formed by each pair of ribs can be adjusted to suit different crops, conditions and requirements for stripping.

It should be noted that the combs 14 are formed in preferred arrangements by transverse planar ribs, conveniently made of flat, sheet-like, synthetic plastics material. However, optionally the leading face of each tooth may be concave. Not every rib 14 need be profiled to form teeth. Good effects can be obtained when alternate ribs 14 are plain edged to scoop up material dislodged by the preceding rib. It is not necessary that such alternate plane ribs should have the same depth radially as the profiled ribs; a reduced depth is often preferable. Variation of the depth of plain ribs following stripping combs gives yet another means of controlling the depth of intrusion of the crop into the rotor space. It is also advantageous at times for the operative plane of the ribs and/or combs to be slightly forwardly or rearwardly inclined to the transverse radial plane.

Further alternative forms of crop stripping teeth are shown in FIGS. 12k to 12s. FIGS. 12k and 12l show a general purpose stripping element 15 which is crimped along its longitudinal centre line, so that the two halves are inclined upwardly on the crop engaging surface. Both side edges diverging from the tip section are profiled to form re-entrant edges to enhance the stripping effect. By way of example, the profiled edge along the left-hand half is formed by scallops and along the right-hand half by serrations. Between pairs of elements 15 a relief aperture 21 is provided. Optionally an upstanding, double-bevel-edged rib 15A may be provided along all or part of the longitudinal centre section, as shown in FIG. 12l.

FIG. 12m shows asymmetrical general-purpose stripping elements. Special features are detailed on the central element and in FIG. 12m, which is a cross-sectional view in the direction of arrows AA in FIG. 12m. The features shown are intended normally to be provided on all the elements of one rotor. The crop engaging edge 16 (on the side of the central element 15) which is perpendicular to the rotor axis is formed by an upstanding fin 16A, which may be perpendicular to the base of the element 15 or may be leaning outwardly towards the adjacent element on the left, as indicated by the broken lines in FIGS. 12m and 12n. The fin 16A may be higher or lower than is shown and may have a double bevel at its upper edge or a single bevel in either direction. The fin 16A may also be scalloped or serrated along its crop engaging edge. This is particularly useful when the fin 16A is outwardly inclined. On the slanting crop engaging edge 17 of the element 15 is provided a ramp-shaped lip 17A, which is easily negotiated by crop particles being thrown off under the effects of centrifugal force but which raises the trajectory of such particles so that their recovery is made more certain.

FIGS. 12p to 12s show on twice the scale of FIG. 12m side views of the asymmetrical stripping element 15 looking from right to left in a direction normal to the side 16 of the element 15 which is perpendicular to the rotor axis. Instead of the upstanding lips or ribs along the perpendicular side being of equal height from front to rear, they may be tapering upwards or downwards from front to rear, as indicated in FIGS. 12p and 12q respectively, they may have a rounded leading section as shown in FIG. 12r, or they may be smoothly curved as in FIG. 12s. As shown, the upstanding ribs have a single-bevel upper edge so that, when the ribs are perpendicular to the base, the reaction of seeds or crop parts detached by the beveled surface is movement to the left in the direction of the adjacent element.

It should be noted that symmetrical general purpose stripping elements may also be provided with one upstanding rib, perpendicular or outwardly inclined, with the other edge optionally provided along its length by a ramp-shaped lip.

Typical applications of the invention are shown in FIGS. 13c to 13f. In FIG. 13c, a conventional combine harvester 124 is shown to have a crop stripping header 125 embodying the invention, in place of the conventional cutting table. The grain and other material detached from the crop is delivered into lateral crop transfer means 8, in this case a transverse crop auger 27 from which it passes to a crop elevating means 7, in this case a central feed conveyor 31, and thence to the threshing drum and separating and cleaning mechanisms of the combine harvester. The small amount of efflux at the rear is spread evenly by a rotary spreading mechanism.

FIG. 13d is an outline front view of a tractor-mounted stripping header 125 delivering the detached material onto a lateral crop transfer means, in this case a transverse belt conveyor 126, and then onto a crop elevating means in this case a cleated-belt elevator 127 for delivery into a bulk trailer 128 drawn by a second tractor. The tractor 124A operating the stripper header 125 has reverse-drive facility so that the operator can effectively supervise the harvesting operation. FIG. 13e, shows an outline plan view where the tractor and trailer wheels are seen to be fitted with crop dividers 128A for parting the straw or other stripped crop so that the wheels can pass without pressing down significant amounts of it. An outline side view of the stripper harvester of FIGS. 13d and 13e is shown in FIG. 13f.

There will now be discussed a number of general features which may be applicable to various embodiments set out above.

In addition to means for adjusting the height of the stripper mechanism and/or the hood or other guide means, by judgement of the operator, there may be provided sensors on or in front of the stripping header, or each section of such a header, to identify the crop horizon, the signals derived from the sensors being used to control the height of the stripping. header or a section thereof, automatically. Normally the lower extent of stripper height setting will be provided by skids under or to the rear of bottom-dead-centre.

A further additional feature which may be provided in any of the embodiments described, comprises a reciprocating cutter bar or rotary cutter which may be fitted for severing the stripped material at a preselected height above ground, after stripping.

Considering now generally the dimensions which may be used in embodiments of the invention, preferably the stripping rotor 11 for cereal and most forage crop has an overall diameter of 500–600 mm. However, smaller diameters are suitable for short or low crops (as in FIG. 1c), and larger diameters for particularly tall crops. By way of example, appropriate tip speeds of stripping rotors embodying the invention for the harvesting of cereals range from less than 10 m/s to approximately 25 m/s, and for harvesting lucerne (alfalfa) leaf, speeds should be in the range of 15 to 30 m/s. Although the stripping rotor 11 in FIG. 1a is shown as having eight rows of elements fewer or more may be used. The combs or ribs, or other forms of rows of elements, need not be arranged in straight rows perpendicular to the direction of travel but they may be curved or helically mounted, to even out the drive torque and achieve delivery of the stripped material to one side or into the centre of any collecting device. By way of example of particular dimensions which may be used, the rotor shown in FIG. 11a may have a diameter of 550 mm overall; the diameter of an inner core may be 300 mm, and the depth of each element from the tip to the base of a recess between adjacent elements may be 80 mm. In typical use in standing cereal crops, the bottom of the rotor may be set to 250 to 300 mm above the ground. Conveniently the bottom of the rotor may be set to a height equivalent to about one quarter of the height of the crop.

Where the overall diameter of the rotor is in the range 400 mm to 700 mm, the rate of rotation of the rotor may be preferably in the range 250 to 950 rev./min.

Rotor outer diameters may vary from approximately 200 mm to 1000 mm diameter, a preferred range being 400 mm to 600 mm diameter. Tip speeds of the crop engaging elements may vary within the approximate range 5 to 40 m/s.

Considering further the general arrangement of the apparatus, and dimensions which can be used, it has been found that there is an important relationship between so called header losses (that is to say losses of free grains and heads or part heads) and the vertical front clearance of the rotor hood relative to a datum level of the bottom-dead-centre of the stripping rotor. Adjustment of the vertical clearance at the front of the hood was found to be particularly effective in reducing header losses. Losses decreased steeply with increasing clearance up to around 250 mm and reached a minimum at around 350 mm.

Thus in many preferred forms of the invention, the vertical front clearance of the rotor hood relative to the bottom-dead-centre level of the rotor, lies in the range 300 to 370 mm, preferably in the range 330 to 350 mm. In most normal conditions horizontal hood-to-rotor clearance is of secondary importance, but preferably should be at least 90 mm in most crop conditions.

By the vertical front clearance of the rotor hood relative to the bottom-dead-centre level of the rotor is meant the height of the lowest portion of the hood projecting in front of the stripping rotor, above a horizontal plane passing through the bottom-dead-centre of the stripping rotor. By the horizontal hood-to-rotor clearance is meant the distance between the lowest point of the hood projecting towards the rotor, and a vertical plane, passing through the front-dead-centre of the periphery of the stripping rotor.

A preferred feature of the invention is that the said guide means which co-operates with the crop engaging elements (e.g. a hood or auxiliary rotor), defines a funnel-shaped intake region into which the crop is guided for stripping by the crop engaging elements.

In FIG. 14 there is shown a modification of the apparatus shown in FIG. 11a. The stripping rotor 11 is shown to have eight rows of transverse stripping elements 15, each set approximately 15° forwardly inclined to the radius. At this inclination performance is slightly better than in the radial deteriorates. The closed rotor core 13 is formed by flat planar slats or panels 50 set approximately tangentially trailing from the base region of one row of elements 15 to a level just inwards of the bottom of the relief apertures 21 (where provided) on the next row of elements 15. In front of the stripping rotor 11 is an auxiliary, counter-rotating rotor 51, forming between them a crop flow passage 33 with active elements on both sides. The preferred diameter of the auxiliary rotor 51 is 180-280 mm, most preferably 200 mm. In front of the auxiliary rotor 51 and attached to the lower edge of the static hood 18 serving both rotors 51 and 11 is a slidably adjustable deflector plate 52 which also shields the crop from coming into contact with outwardly extending ribs 53 of the auxiliary rotor 51 prematurely. It has been found that the trailing edge 54 of the deflector plate 52 is preferably set to be 60–100 mm in front of a vertical plane through the axis of the auxiliary rotor 51. The trailing edge 54 of the deflector plate 52 provides a sharp cut-off and helps to retrieve seeds from low trajectories to a greater extent than a forwardly curved front plate. A full-width curved or angled profile or pressing bar 54', positioned on the upper deflector plate surface forward of the trailing edge 54, serves to deflect particles arriving from either direction into the auxiliary rotor so that they are impelled into the crop flow passage 33 or across it into the stripping rotor 11 for positive recovery.

Above the deflector plate 52 the rotor hood 18 may be arranged as shown in solid outline or, optionally, it may surround the upper front quadrant of the auxiliary rotor 51, as shown in broken outline. An auxiliary rotor 51 with six straight transverse ribs 53 has been found to be effective, particularly when the tip speed was approximately 2.2 times forward speed. The transverse ribs 53 of the auxiliary rotor 51 may also be arranged in helical form, or a split helix. In such an arrangement crop is fed to the main rotor 11 for stripping gradually and consistently despite the stripping elements 15 on the main rotor 11 being mounted in straight transverse rows.

A particular feature is that the auxiliary rotor at the intake region of the hood has a relatively large diameter and an aggressive surface. The full-width rotor has very pronounced full-width paddles which are preferably made of plastics material, forwardly or rearwardly inclined and helically arranged to create a constant-load condition for the stripping rotor even though the stripping elements may be arranged in straight transverse rows.

Seeds and crop particles detached from the crop by the stripping elements 15 are assisted in leaving the rotor envelope by the tangentially arranged panels 50 forming the rotor core 13. At suitable stripping rotor tip speeds, which for cereal crops are in the region of 15-25 m/s, the bulk of the detached particles clears the stripping rotor 11 well before reaching the top-dead-centre position. The hood section 18 forming the front wall of the stripper header directs the stream of detached seeds and material other than grain (MOG) from a steeply rising trajectory into a near-horizontal path, across an optional gap 34 in the hood 18 to allow for some air escape under the top wall 23 and towards a rear cover 23 of the header unit. Optionally placed into the path of the particle stream is at least one transverse row of spaced-apart wires or fins 26, to deflect the larger particles downwardly into a path which is complementary to the direction of rotation of a centre-delivering feed auger 27. Small particles, especially seeds, are able to pass through the screen and then impinge on the upper part of a rear wall 61 which, preferably, is provided with an impact absorbing curtain or lining 55. If an optional, additional, transverse auger 56 is present, as shown in FIG. 4, the seeds and other small particles can be collected; otherwise they fall behind the main conveying auger 27 onto the coarse material which occupies the space around the lower rear quadrant of the auger 27. In an alternative modification, instead of the separating means 26, there may be fitted a full-width deflector (shown in broken line at 23A) for all the crop detached by the rotor 11, to feed it on to the transverse crop auger 27 complementary to its forward rotation at the top.

Should any seeds ricochet forwardly off the tube or flighting of the auger 27, they are prevented from re-entering the stripping rotor space by a baffle 57 in front of the auger 27. Preferably the upper leading edge 58 of the baffle 57 is located close to the tip circle of the stripping rotor 11 slightly behind top dead centre, so that accumulation of long crop particles cannot occur. The baffle 57 has a short upper surface 59 and a much longer lower bent or optionally curved, surface 60. The space between this lower surface and the stripping rotor 11 provides an escape route for any seeds or crop particles which leave the rotor late. Such particles are guided into the collecting space immediately in front of the auger 27 but behind a ramp 29 extending full-width across the front of the auger pan 28. The crop guide surface of ramp 29 may be stepped optionally or undercut in such a way that ricocheted particles moving towards the stripping rotor 11 are arrested. It is a secondary purpose of the lowermost part of the baffle 57 between auger 27 and stripping rotor 11 to guide and hold coarse material descending in front of the auger 27 so that it is gripped by the flighting and drawn under.

In the centre section of the stripping header 125 the crop conveyed across from both sides is moved rearwards by fingers (not shown) protruding through the tube of the auger 27, or by transverse vanes (not shown), into the path of a crop elevator 7, as provided on conventional combine-harvesters.

To allow for the escape of more air conveyed by the stripping rotor 11 into the header space, a shielded opening 62 is provided in front of the rear wall 11 at the top. This "flue" is so constructed that escape of wanted particles is made difficult. An optional short, flexible curtain 63 above the centre of the grain auger 56 contributes to the retention of wanted material. To raise or lower the header 125 to the required height position, a hydraulic lift ram 64 is provided and acts on a bracket 65 behind and slightly above skid 66.

FIG. 14a shows modification of the apparatus of FIG. 14, including a small supplementary rotor 67 of, say, 150 mm diameter immediately behind the lower rear quadrant of the main stripping rotor 11. The purpose of this is to recover wanted particles which may leave the stripping rotor 11 late and impell them, by means of forwardly raked transverse fins 68, into a recovery trajectory, namely upwards and rearwards towards the stream of coarse crop particles moving downwards at the front of the cross-conveying crop auger 27. Immediately behind the supplementary rotor 67 is a static ramp 29 to shield the supplementary rotor 67 and urge material in the direction of the auger 27.

FIG. 15 shows a similar header arrangement with a preferred construction of a lower portion of the hood 18, but without the optional auxiliary rotor 51 of FIG. 14. Material which falls onto the floor behind the stripping rotor 11 is conveyed into the crop auger 27 by a stepped pan 69 supported on rocker arms 70 and actuated by a simple eccentric drive. The drive arrangement is indicated in broken outline at 71, and may be positioned as shown or at alternative angles to the plane of the pan.

Instead of the jog-trough principle described above for conveying crop into the auger 27, the stepped pan may be reciprocated fore and aft on rollers, or it may be pivotted in the centre or at the downstream end.

In FIG. 16 there is shown a modification of the apparatus of FIG. 15 including a self-cleaning air floor 72 to convey stripped material into the auger. The floor 72 is constructed to be effectively a short, full-width plenum chamber into which air is blown from a fan or fans 73. Horizontal slits in the vertical parts of the steps cause air to be forced up the miniature ramps and thus convey any material lying on the floor section towards the auger 27.

In FIG. 17 there is shown a height-adjustable auxiliary rotor 51 which may be controlled remotely. A front portion 74 of the hood 18 is flexible or constructed to be similar to a roller blind and is guided in a curved track 75, which itself is pivoted at pivot 76 The shaft 77 of the rotor 51 protrudes through slots 78 in each of two end plates (not shown), of the hood 18, permitting hydraulic rams 79 connected for example to the end bearings of the shaft 77 on the outside of the end plates, to raise and lower the auxiliary rotor 51 in accordance with crop conditions. The extreme positions are determined by the length of the vertical slots 78. Connection of the rotor shaft 77 with the front hood 74 is by fin-shaped brackets 80 at each end and optionally at one or more intermediate positions.

If the hydraulic ram 79 is shortened, the rotor 51 is lifted, the upper end of the flexible hood slides further along the guide rails, and the rails themselves can pivot, to prevent binding of the hood at the front.

A particular advantage of a height-adjustable auxiliary rotor is that in crops which are leaning or laid and can only be harvested lying away from the header, the auxiliary rotor 51 can be used to re-orientate and lift the crop to be presented more suitably for stripping.

Additional features disclosed in FIG. 17 are a freely rotating or driven roller 81 forming the leading edge of the crop baffle 57 and a louvred wall section 82 above the conveyor 7, to allow the escape of air without loss of wanted particles.

In FIG. 18 is shown an alternative arrangement for a height adjustable front hood 18 and auxiliary rotor 51 which avoids the need for pivotting guide rails. It should be noted that raising or lowering of the hood alone or the hood/auxiliary rotor combination can be achieved by different forms of simple lever linkage or cables provided for example outside the end plates of the header unit.

FIG. 19 is an end view of an auxiliary stripping rotor 51. The transverse fins 53 may be arranged to be radial or set at a trailing or leading angle. FIG. 19a is a section through AA in FIG. 19, showing that the ribs or fins may be plain, notched or otherwise profiled. They may also be made of flexible material, such as rubber or soft plastic, to prevent damage if contact is made with the ground or objects lying on the ground.

FIG. 20 shows the preferred stripping rotor 11 feeding the detached material into a funnel formed between an upper crop guide surface and a self-tensioning belt threshing mechanism 85. A threshing belt 86 is surrounded at the rear and beneath it by an open-grate concave 87. Free grain in the detached crop material will pass through the concave 87 almost immediately, whilst unthreshed or partly threshed heads will travel further before all seeds are detached and separated out. Beneath the lower part of the concave 87 is a reciprocating shaker shoe 88 so arranged that it forms a passage through which air from a radial fan 89 is blown, to carry rearwards any light material such as chaff and other small fragements. Any long straw emerges from the end of the concave 87, to fall onto the ground behind the stripping rotor. Behind the threshing mechanism baffles prevent separated seeds from being lost and direct them onto the shaker shoe. This, in turn, feeds the cleaned seed into a transverse auger 88' for collection in a bulk container.

The working width of the threshing mechanism is identical to, or only slightly less than, that of the stripping rotor 11. The system as shown, therefore, is particularly suited to smaller harvesters, as are appropriate in less intensive farming systems, for example for the harvesting of rice. By the provision of wide stripping headers with centre or side delivering crop augers, the system finds wider application.

In FIG. 21 the stripping header 125 is provided with grain separation and collection at screen 26 and auger 56, so that only the coarse material requiring further threshing is fed through a rear opening 90 in the header to a multi-rotor threshing mechanism shown generally at 91. A feeder beater 92 delivers the material to a conventional threshing drum 93 over an open-grate concave 87 which then continues under subsequent rotors 95, 96, 97. Adjacent to the first threshing drum 93 there is the further stripper beater 95. Cleaning and collecting of the seeds which pass through the concave are achieved by means similar to those described before in the context of FIG. 20.

FIG. 22 shows a compact system of maximising the effectiveness of two successive, co-rotating threshing drums for processing stripper harvested material with a low MOG content. A first drum 98 is fed with crop by a feeder beater 92 and rubs the material in a closed concave 100 above. Then a second drum 101 takes over and continues the rubbing process in the first, closed part of an overhead concave 102. At approximately the one o'clock position the design of concave 102 changes to an open grate, so that freed seeds can pass outwards to fall through an air blast created by a fan 103 below a shaker shoe 104. In this case the shoe is designed and reciprocated to deliver the seed sample into an auger 105 at the rear. Threshed straw passes back onto the ground under the first threshing drum 98.

The embodiments described show the advantages of the stripping concept particularly in terms of the very low MOG content of the harvested sample, in respect of the ability to achieve final threshing and seed cleaning by close-coupled compact mechanisms, as opposed to the very bulky conventional combine-harvest layout. In the most compact forms of final processing mechanism, in embodiments of the invention only one threshing drum is required behind the header.

In FIG. 23 is shown a section of a stripping element 15 of the form described hereinbefore which is made from resilient plastic material, for example polyurethane. To increase the wear resistance at the leading edges of individual stripping teeth 15, pre-formed metal strip 106 is bonded onto the teeth, as shown. The tooth 15 on the left has a strip 106 which continues into the recess 21; in the centre tooth 15 the strip 106 continues inwards from the shoulders of the tooth 15 at optional angles; on the righ-hand tooth 15 the strip 106 terminates at the shoulders of the aperture 21.

At the base the fastening strip 106 is made of metal and has slots for mounting and laterally aligning the elements. FIG. 24 is a view along the direction BB, in FIG. 23, showing the metal strip in side view and the bonding region in cross-section. In FIG. 25 is shown a section along the direction AA in FIG. 23, indicating the probable wear pattern which leaves the teeth 15 cupped, with the metal edges 106 remaining proud.

Returning to FIGS. 17 and 18, it has previously been said that the auxiliary rotor can be supported in the centre, if necessary, by a metal fin attached to the hood. Similarly, very wide stripping rotors can also have intermediate bearings supported on metal fins. These are attached most appropriately to the forward section of the auger pan for example as a continuation in the direction of the rotor shaft of the wedge shown immediately behind the stripping rotor in FIG. 14.

I claim:

1. Apparatus for harvesting required crop parts from standing crop comprising
   a mobile frame for movement over the ground,
   moveable support means mounted for driven movement relative to the frame,
   a plurality of outwardly projecting crop engaging elements mounted on the moveable support means,
   guide means cooperating with the crop engaging elements to form a crop flow passage, and
   drive means for driving the moveable support means to carry the elements upwardly at a front region of the apparatus so as to detach predetermined required parts of the crop from said standing crop and to move the detached crop parts along the crop flow passage, the crop engaging elements being arranged to engage standing crop while projecting forwardly relative to the direction of forward travel of the apparatus,
   wherein there are provided at the junction of adjacent crop stripping elements at least two relief spaces for detaching crop parts by the effect of edges of the stripping elements and for allowing stripped remaining crop parts to be released from the elements.

2. Apparatus according to claim 1 in which the relief spaces are defined by re-entrant edges extending sideways into the crop engaging elements and adapted to strip crop parts from regions of the standing crop which face forwardly relative to the intended direction of movement of the apparatus.

3. Apparatus for harvesting required crop parts from standing crop comprising
   a mobile frame for movement over the ground,
   moveable support means mounted for driven movement relative to the frame,
   a plurality of outwardly projecting crop engaging elements mounted on the moveable support means,
   guide means cooperating with the crop engaging elements to form a crop flow passage, and
   drive means for driving the moveable support means to carry the elements upwardly at a front region of the apparatus so as to detach predetermined required parts of the crop from said standing crop and to move the detached crop parts along the crop flow passage, the crop engaging elements being arranged to engage standing crop while projecting forwardly relative to the direction of forward travel of the apparatus,
   wherein there are provided at each junction between adjacent elements two succeeding relief spaces which lead inwardly away from the distal ends of the elements, the first relief space including edges facing away from the distal ends of the elements adapted to detach crop parts from regions of the standing crop which face forwardly relative to the intended direction of forward travel of the apparatus, and the second relief space having boundaries which diverge from each other at the entrance to the second relief space so as to provide a relief region for allowing stripped remaining crop parts to be released from the elements.

4. Apparatus for harvesting required crop parts from standing crop comprising
a mobile frame for movement over the ground,
moveable support means mounted for driven movement relative to the frame,
a plurality of outwardly projecting crop engaging elements mounted on the moveable support means,
guide means cooperating with the crop engaging elements to form a crop flow passage,
drive means for driving the moveable support means to carry the elements upwardly at a front region of the apparatus so as to detach from standing crop predetermined required parts of the crop and to move the detached crop parts along the crop flow passage, the crop engaging elements being arranged to engage standing crop while projecting forwardly relative to the direction of forward travel of the apparatus,
wherein the crop engaging elements provide in operation a plurality of crop gathering regions each having an intake region with inwardly converging boundaries leading to at least two succeeding relief regions, at the junction of adjacent crop stripping elements which lead inwardly away from the distal ends of the elements, each relief region having boundaries which diverge from each other at the entrance to the relief region.

5. Apparatus according to claim 4 in which the boundaries of at least some of the relief regions include edges of crop engaging elements facing away form the distal ends of the elements adapted to detached crop parts from regions of the standing crop which face forwardly relative to the intended direction of movement of the apparatus.

6. Apparatus according to claim 4 in which at least some of the relief regions are defined by re-entrant edges extending sideways into the crop engaging elements.

7. Apparatus according to claim 4 in which the boundary of each relief region lies substantially on a circle.

8. Apparatus according to claim 4 in which each crop engaging element has a distal tip for entering into and dividing crop, and has side edges diverging from each other in a direction away from distal tip of the element.

9. Apparatus according to claim 8 in which each crop engaging element has a transverse surface for impelling detached crop parts along the crop flow passage.

10. Apparatus according to claim 9 in which the drive means is arranged to drive the crop engaging elements at a speed such that detached crop parts are impelled along the crop flow passage and do not reside to any substantial extent on the moving elements.

11. Apparatus according to claim 4 in which the crop stripping elements are resiliently mounted, and/or made of flexible resilient material.

12. Apparatus according to claim 4 in which the said crop stripping elements are arranged with elements which follow each other along the support means being in register with one another.

13. Apparatus according to claim 4 in which the moveable support means comprises a rotor.

14. Apparatus according to claim 4 in which the said moveable support means comprises an endless conveyor.

* * * * *

UNITED STATES PATENT AND TRADEMARK OFFICE
CERTIFICATE OF CORRECTION

PATENT NO. : 4,991,385
DATED : February 12, 1991
INVENTOR(S) : KLINNER

It is certified that error appears in the above-identified patent and that said Letters Patent is hereby corrected as shown below:

ON THE TITLE PAGE, the Terminal Disclaimer Notice should read as follows:
[*]Notice: The portion of the term of this patent subsequent to October 8, 2002 has been disclaimed.

ON THE TITLE PAGE, Section [30] should be added as follows:
[30]Foreign Application Priority Data
September 27, 1984[GB]United Kingdom....8424395
April 9, 1986[GB]United Kingdom....8608585

Signed and Sealed this

Eighth Day of December, 1992

Attest:

DOUGLAS B. COMER

*Attesting Officer*   *Acting Commissioner of Patents and Trademarks*